(12) United States Patent
Takada

(10) Patent No.: US 7,517,127 B2
(45) Date of Patent: Apr. 14, 2009

(54) LIGHT GUIDE PLATE, INCLUDING INCLINED SURFACE, SURFACE LIGHT SOURCE DEVICE AND DISPLAY USING THE SAME

(75) Inventor: Susumu Takada, Tokyo (JP)

(73) Assignee: Enplas Corporation, Kawaguchi-Shi (JP)

( * ) Notice: Subject to any disclaimer, the term of this patent is extended or adjusted under 35 U.S.C. 154(b) by 0 days.

(21) Appl. No.: 11/355,085

(22) Filed: Feb. 16, 2006

(65) Prior Publication Data

US 2006/0245211 A1     Nov. 2, 2006

(30) Foreign Application Priority Data

Feb. 18, 2005    (JP)  ................................ 2005-041703

(51) Int. Cl.
*F21V 7/04*      (2006.01)
*F21V 5/00*      (2006.01)

(52) U.S. Cl. ..................... 362/608; 362/621; 362/330; 349/65; 385/129

(58) Field of Classification Search ............... 362/608, 362/621, 330; 349/65; 385/129
See application file for complete search history.

(56) References Cited

U.S. PATENT DOCUMENTS

| 5,027,258 | A | * | 6/1991 | Schoniger et al. | .......... 362/629 |
|---|---|---|---|---|---|
| 5,664,862 | A | * | 9/1997 | Redmond et al. | ........... 362/625 |
| 5,825,440 | A | * | 10/1998 | Kim | ............................. 349/61 |
| 5,876,107 | A | * | 3/1999 | Parker et al. | ................ 362/600 |
| 5,921,652 | A | * | 7/1999 | Parker et al. | ................ 362/601 |
| 6,164,789 | A | * | 12/2000 | Unger et al. | ................ 362/610 |
| 7,188,989 | B2 | * | 3/2007 | Miyashita | ................... 362/621 |

FOREIGN PATENT DOCUMENTS

| JP | 11-133425 | 5/1999 |
|---|---|---|
| JP | 2003-331628 | 11/2003 |

* cited by examiner

*Primary Examiner*—Ismael Negron
(74) *Attorney, Agent, or Firm*—Staas & Halsey LLP

(57) ABSTRACT

An emission face of a light guide plate is divided into two portions, a first emission part having a large area and a second emission part having a small area, by a straight line extending from a generally lateral-center position of the incidence face perpendicularly to the incidence face. A slope is formed on the emission face in the vicinity of the incidence face. The slope is formed so that thickness of the light guide plate decreases from a side end portion of the first emission part toward a side end portion of the second emission part in a cross section vertical to the straight line. Further, thickness of the light guide plate may decrease gradually according to an increasing distance along the straight line from the incidence face.

3 Claims, 19 Drawing Sheets

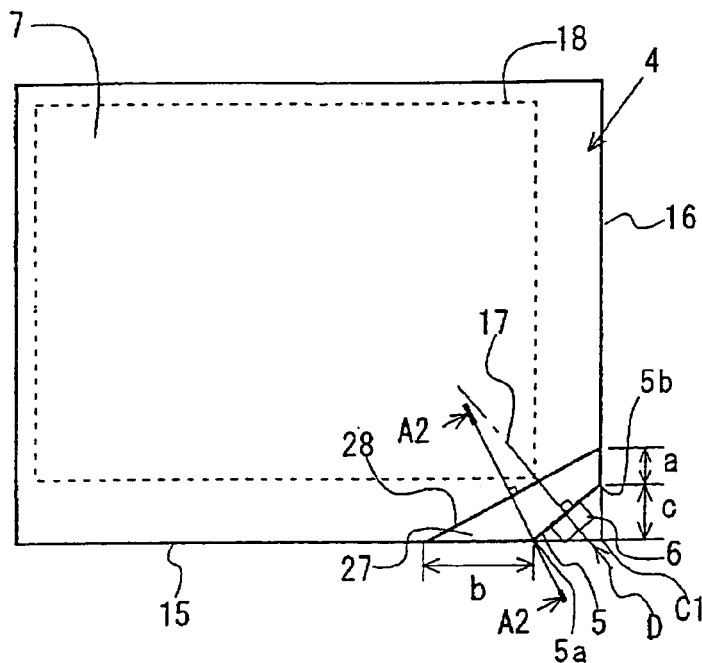
Fig.7a
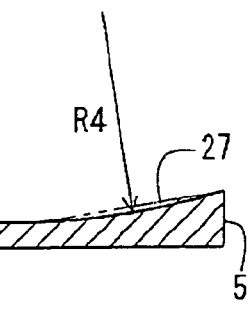
Fig.7c
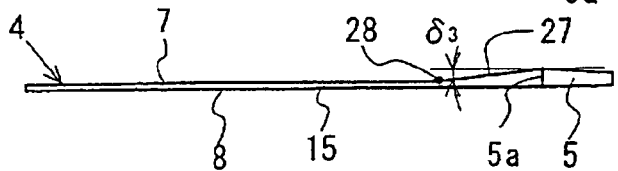
Fig.7b
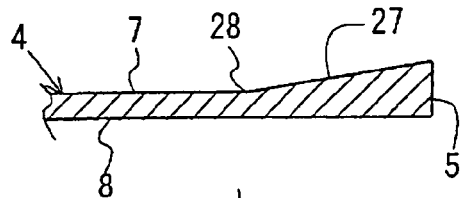
Fig.7d
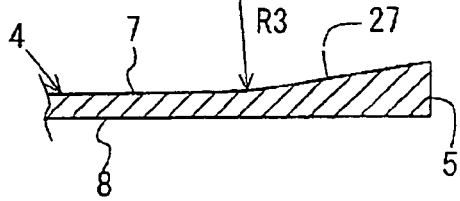
Fig.7e
Fig.7f
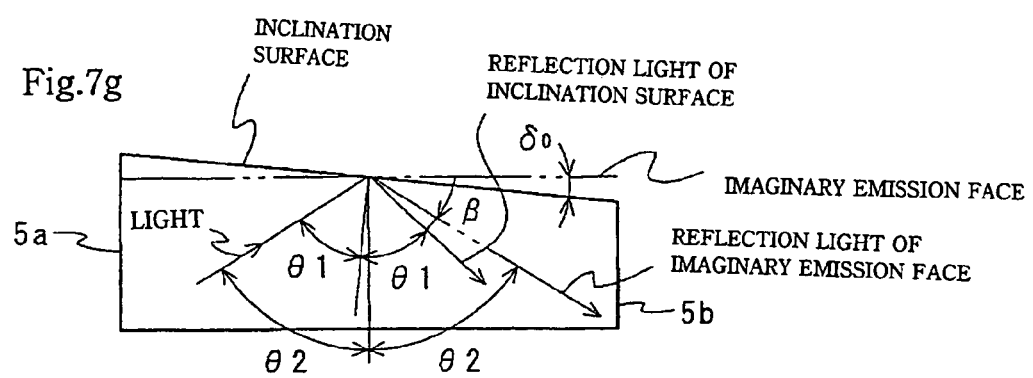
Fig.7g

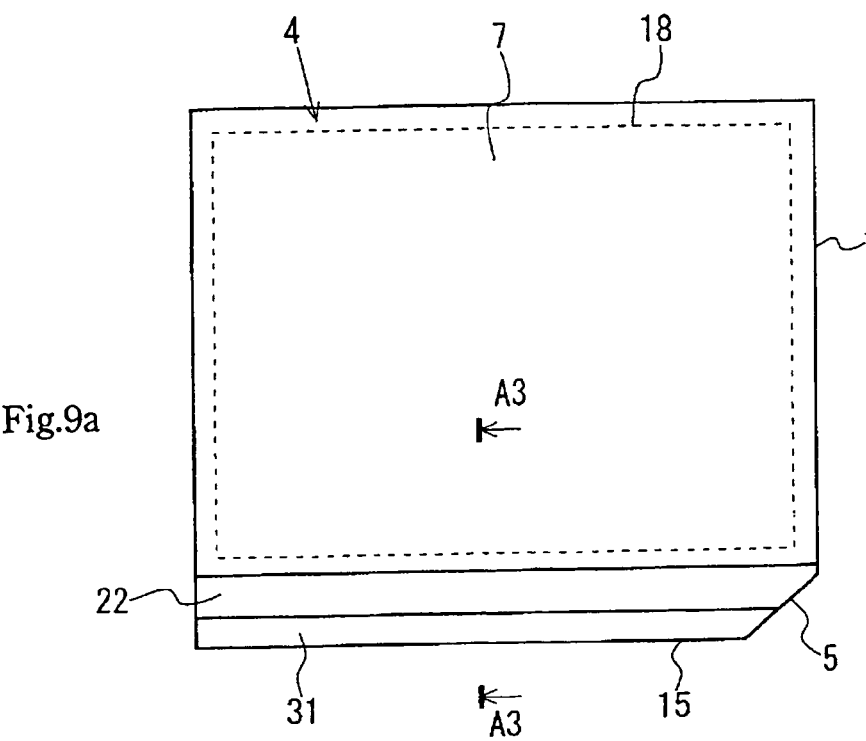
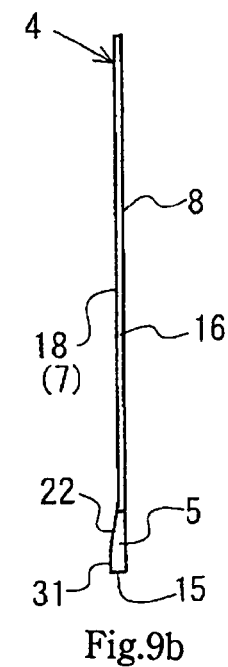
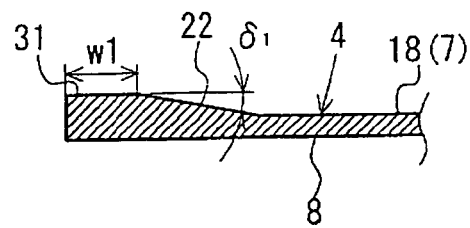
Fig.9a
Fig.9b
Fig.9c

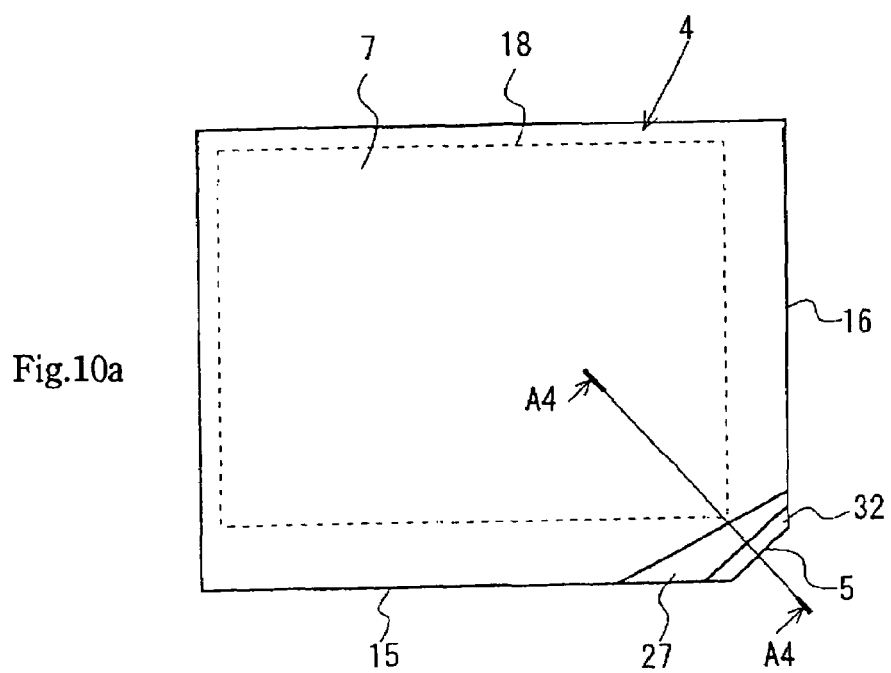
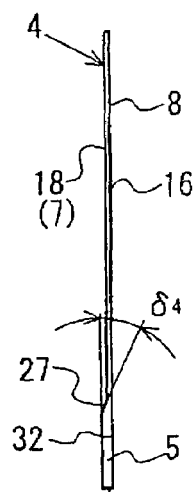
Fig.10a
Fig.10c
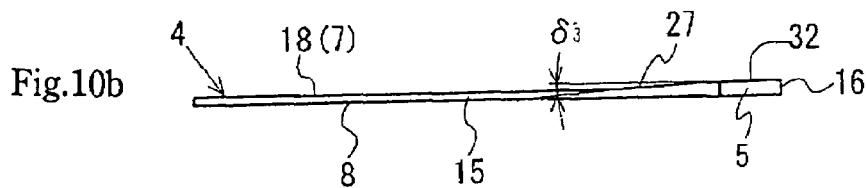
Fig.10b
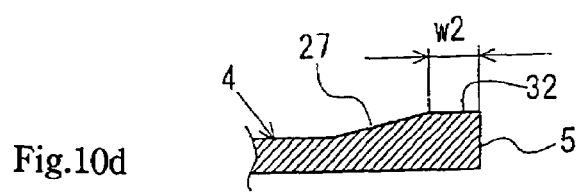
Fig.10d

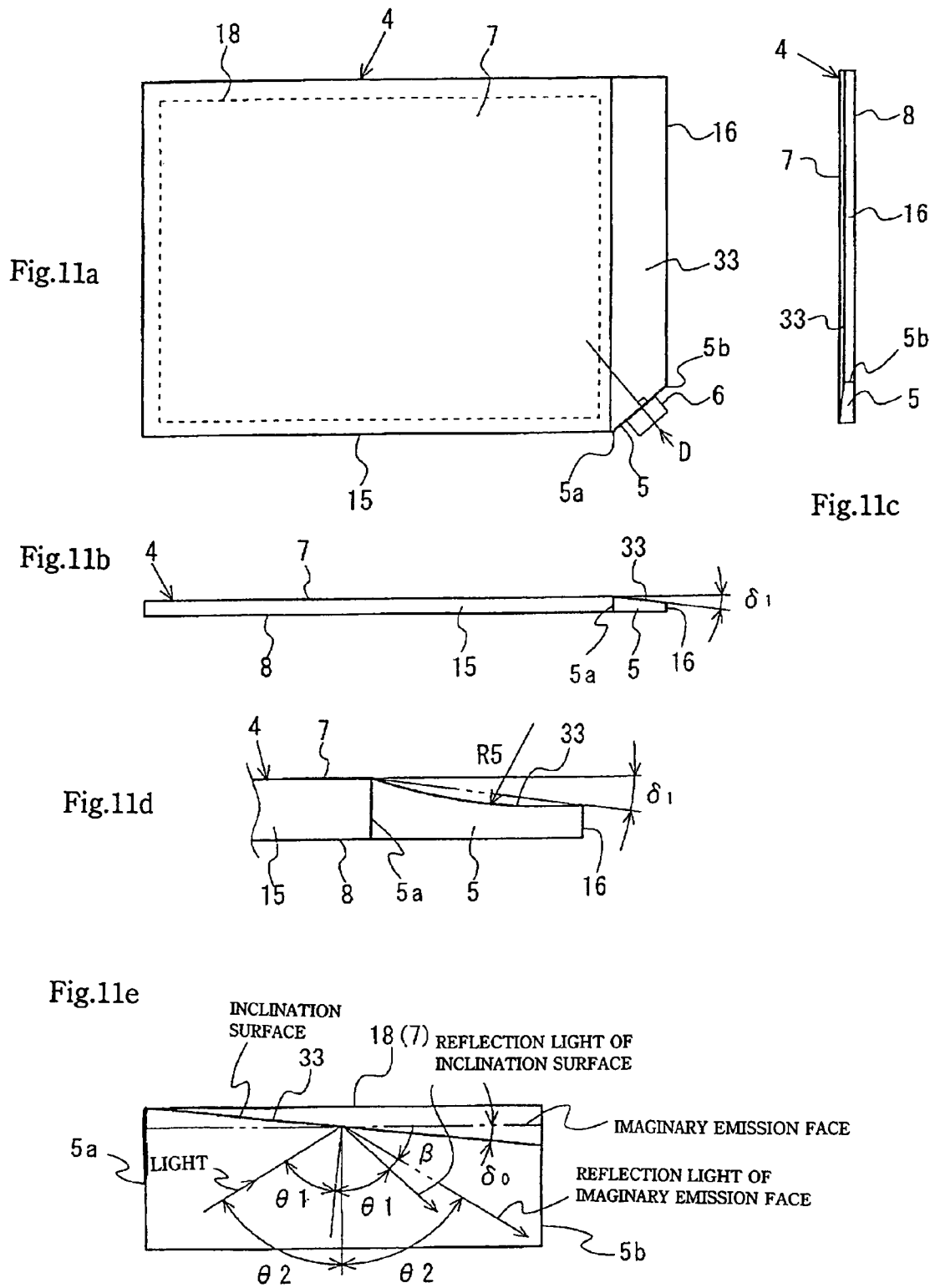

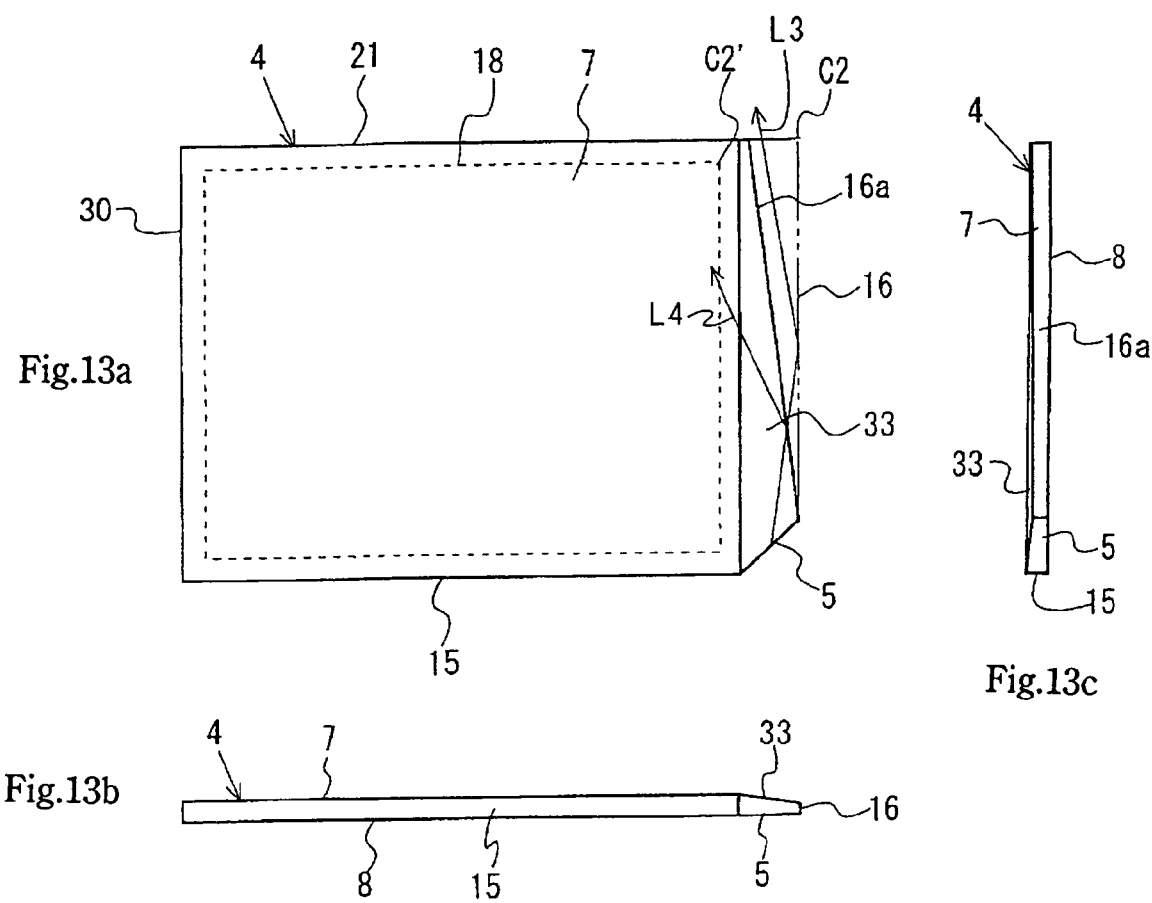

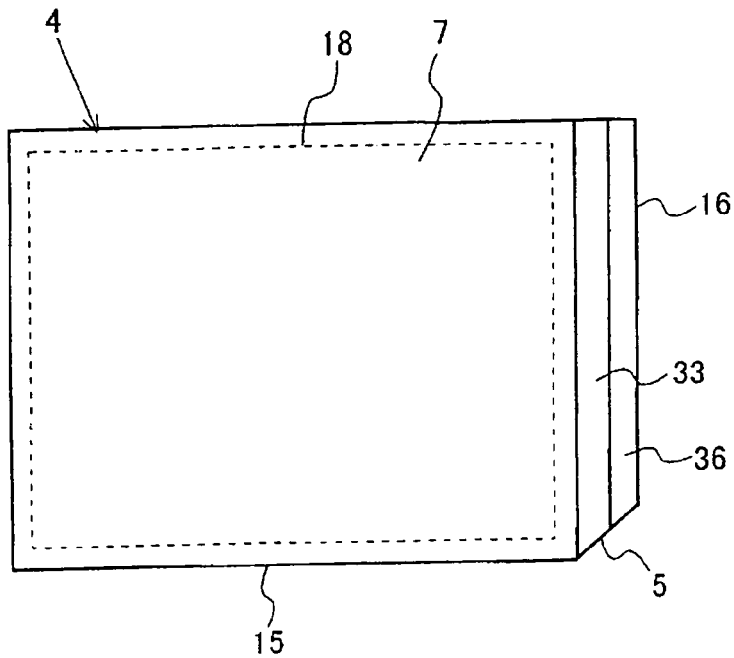
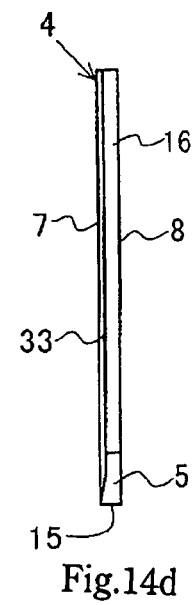
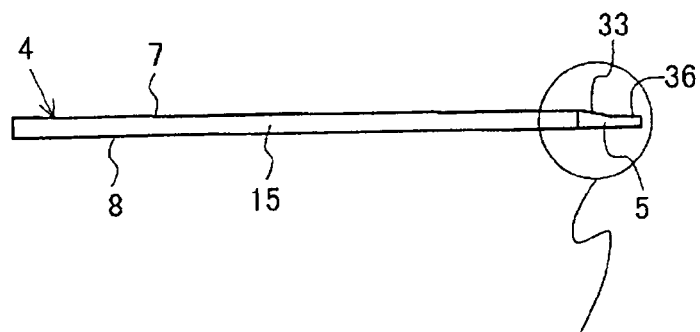
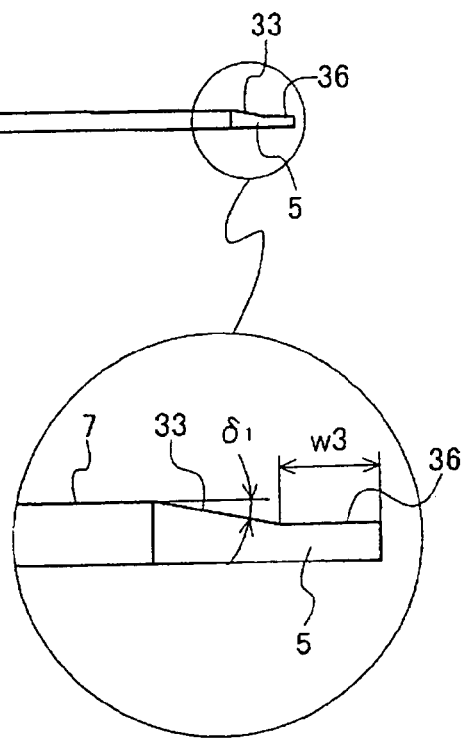
Fig.14a
Fig.14b
Fig.14c
Fig.14d

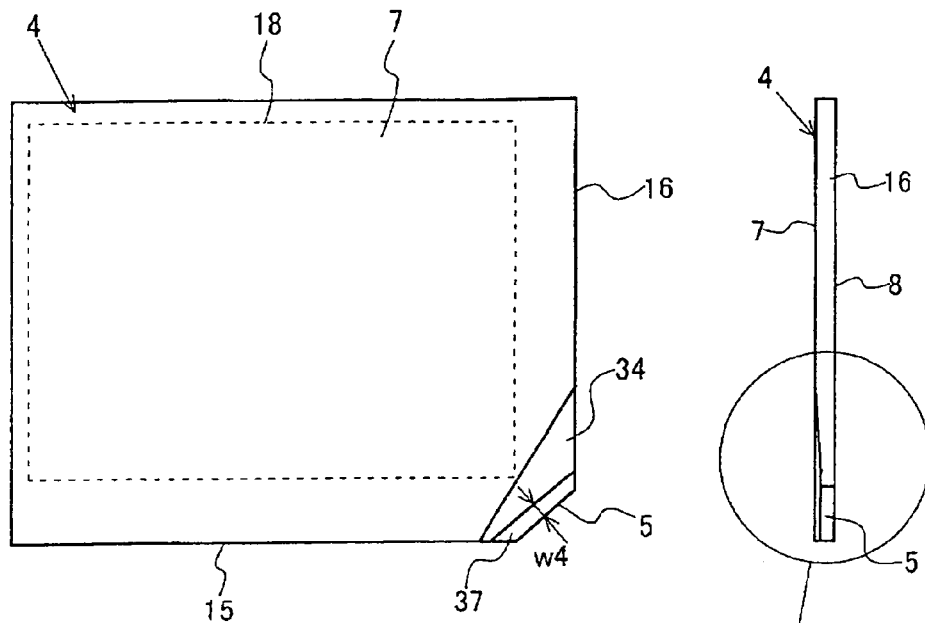
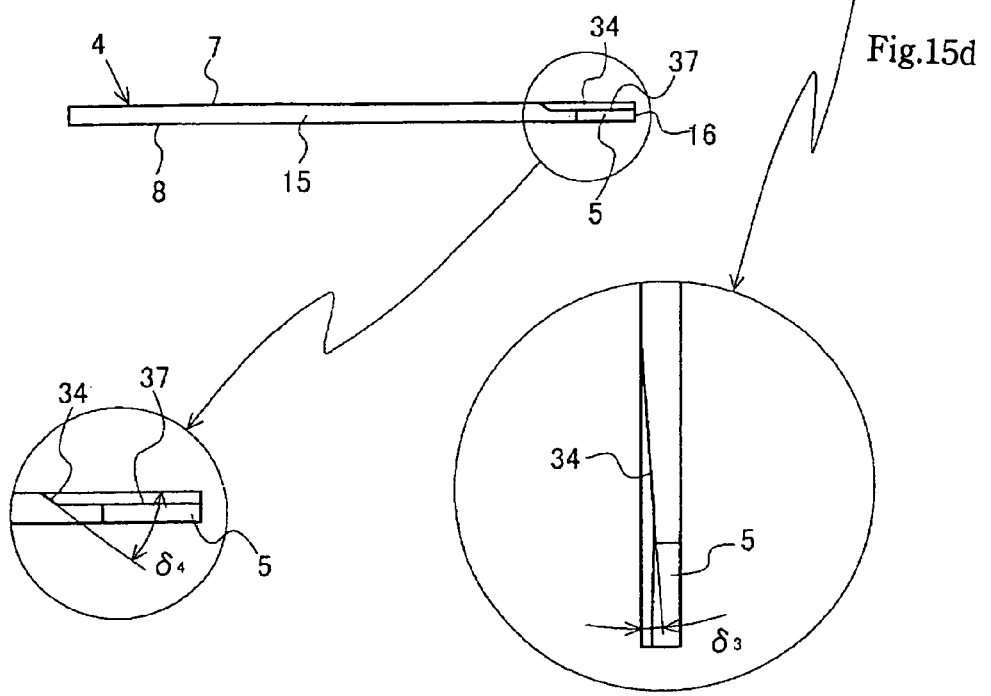
Fig.15a
Fig.15b
Fig.15c
Fig.15d
Fig.15e

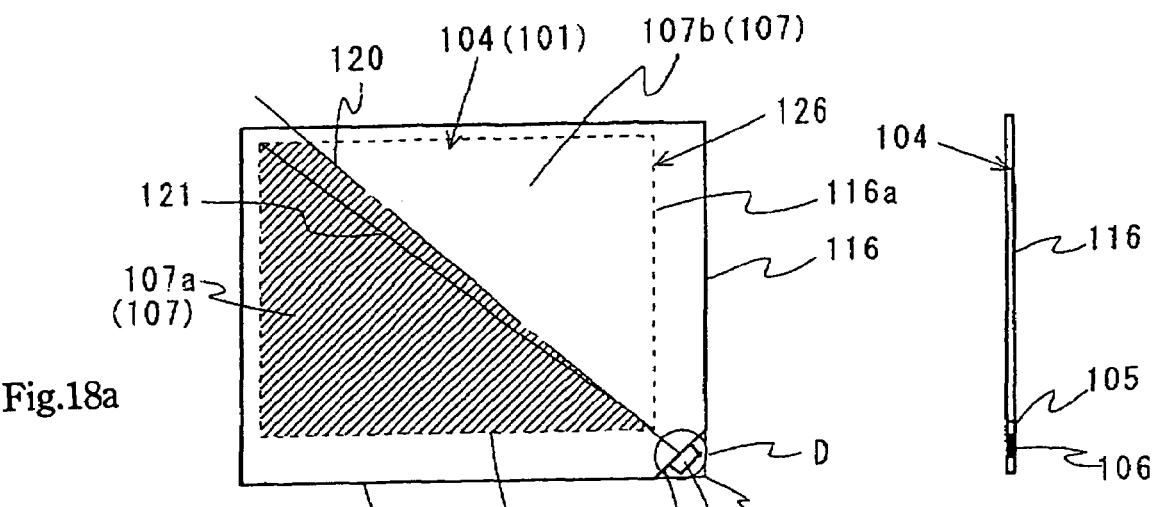
Fig.18a
Fig.18c
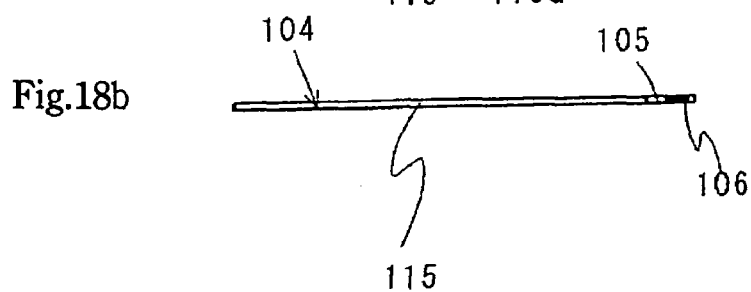
Fig.18b
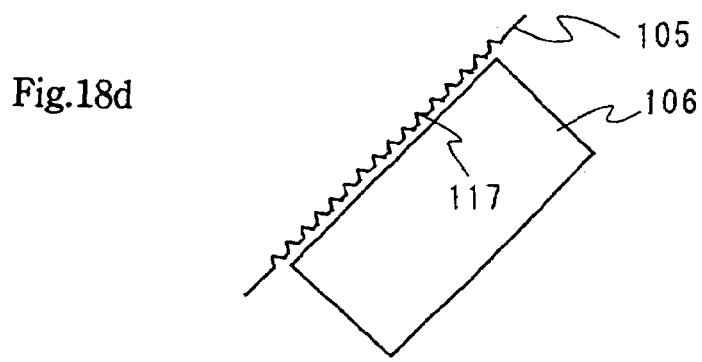
Fig.18d

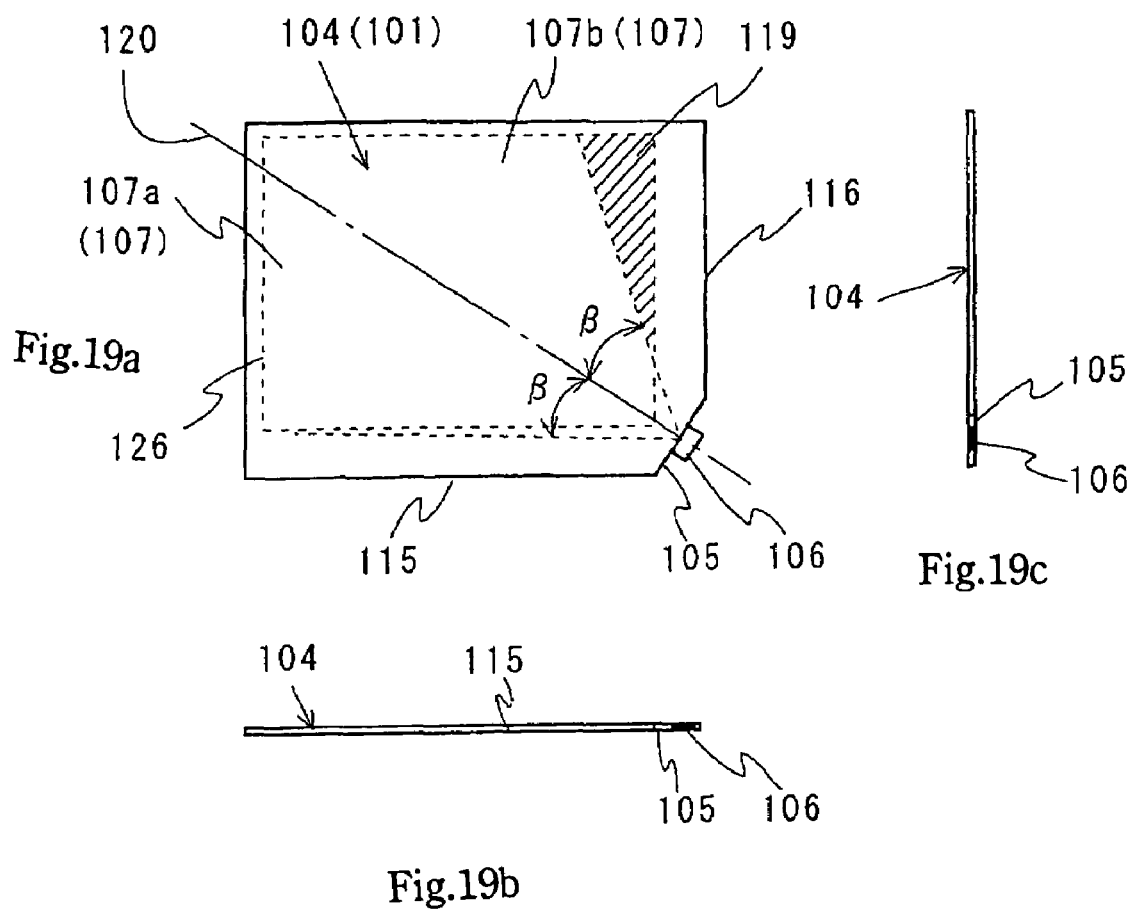

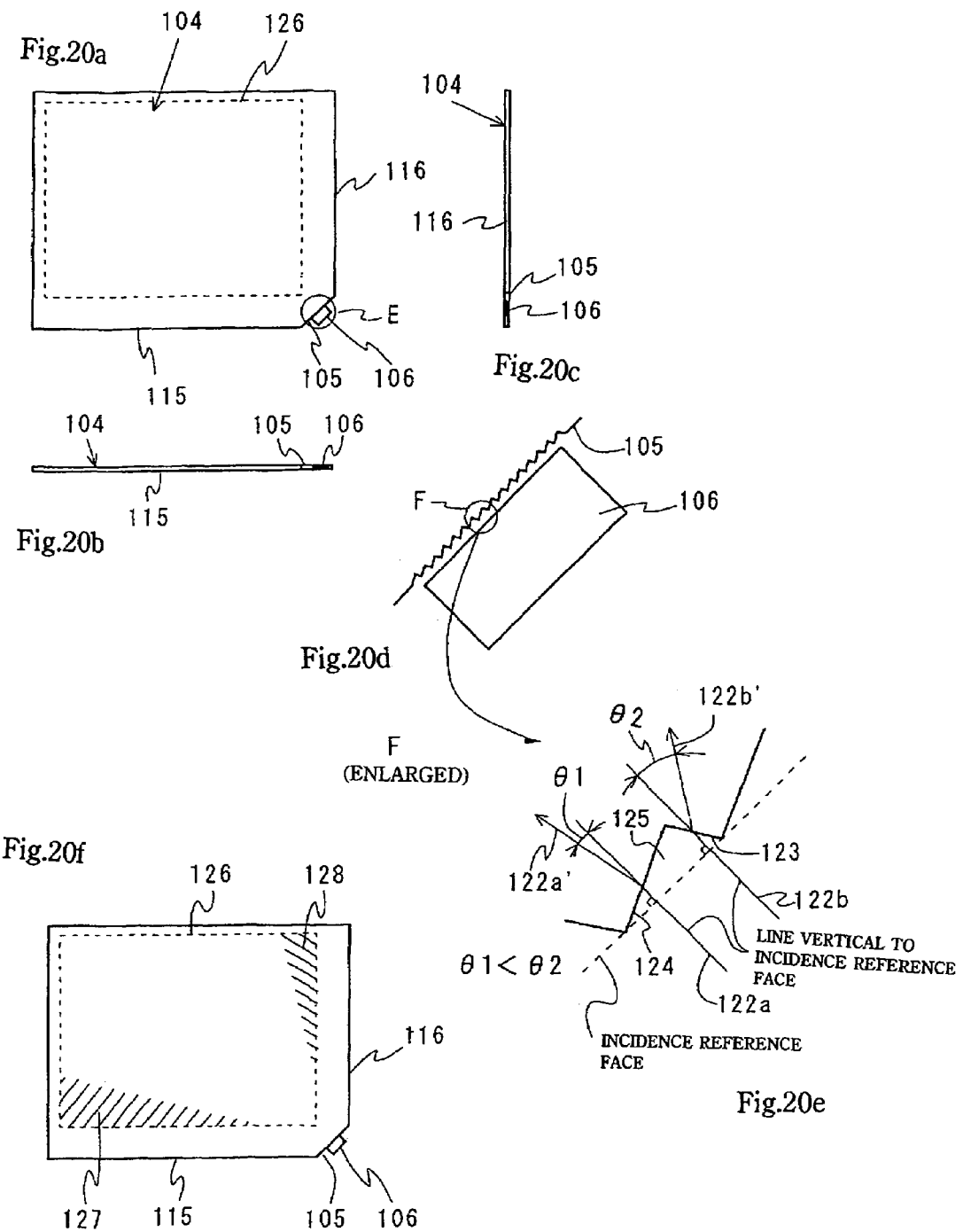

LIGHT GUIDE PLATE, INCLUDING INCLINED SURFACE, SURFACE LIGHT SOURCE DEVICE AND DISPLAY USING THE SAME

BACKGROUND

1. Field of Invention

The present invention relates to a surface light source device used for backlighting an object-to-be-illuminated such as LCD panel or advertising panel, or used for to interior illumination devices, further relating to a light guide plate employed in the surface light source device and a display such as LCD provided with the surface light source device.

2. Related Art

In general, a light guide plate employed in a surface light source device has two major faces and a side peripheral face bridging them. Typically, the major faces are rectangular and the side peripheral face consists of tow pairs of side faces (four side faces). Such a light guide plate is called "rectangular light guide plate" in the instant specification.

It is known well to supply light to a light guide plate through an incidence face provided by a part of a side peripheral face. If a rectangular light guide plate is used, an incidence face is allowed to be formed at a corner portion. This way is suitable particularly for cases where any small type light source (such as LED) is employed as primary light source (light source for supplying light to a light guide plate).

Referring to FIG. 17 showing an example (first prior art) of such a way, surface light source device 101 has a rectangular light guide plate 104 and LED (point-like light source) 106. A corner portion of light guide plate 104 is cut off obliquely to provide incidence face 105.

LED (point-like light source) 106 is disposed opposite to incidence face 105, light from which enters into light guide plate 104 through incidence face 105. The light taken into light guide plate 104 propagates therein. It is noted that "propagating within a light guide plate" is called simply "inner propagation" and "light propagating within a light guide plate" is called simply "inner propagation light" in the instant specification.

On the way of inner propagation, light component having an incident angle not greater than critical angle to emission face 107 of light guide plate 104 is emitted from emission face 104 and transmits through light control members 114 such as light diffusion sheet disposed opposite to emission face 107, then illuminating an object-to-be-illuminated such as LCD panel 103.

In general, LED 106 emits light has a certain diverging angle which is not so large usually. This causes accordingly an inner propagation light to have a not so large diverging angle. As a result, some parts fails to receive sufficient inner propagation light. In particular, enough light hardly reach areas close to which incidence face 105 is connected to side faces 115, 116, respectively, with the result that dark portions tend to appear in the areas.

FIGS. 18a to 18d illustrate a second prior art employable to overcome such problem, which is disclosed in Document 1 noted below. FIG. 18a is a plan view of a light guide plate employed in the second prior art and FIGS. 18b and 18c are side views of the light guide plate, as viewed from one side and another side thereof, respectively. FIG. 18d is an enlarged partial view of part D in FIG. 18a.

Referring to FIGS. 18a to 18d, light guide plate 104 has incidence face 105 provided with many V-like grooves (recesses) 117 or prismatic projections. V-like grooves (recesses) 117 look "isosceles-like" cut-off portions, as viewed from the above emission face 107. Light from LED 106 is diverged by recesses 117 or prismatic projections, becoming an inner propagation light having diverged travelling directions. As a result, light reaches areas near to sides 115, 116 sufficiently.

This enables an "effective light emitting area" to be provided. It is noted that "effective light emitting area" is an effectively used part of emission face 107 of light guide plate 104 for actually taking out illumination light, such as area 126 surrounded by a rectangular dotted-line shown in FIG. 18a. LCD panel 103 is backlighted by illumination light outputted from effective light emitting area 106.

This art prevents areas close to both sides 115 and 116 from short of brightness. However, there arises another problem, namely, brightness unbalance in an "effective light emitting area".

Referring to FIG. 18a, reference numerals 115a and 116a denote long and short sides of effective light emitting area 126, respectively. Further, an "incidence reference face" is formed by cutting off corner portion C1 along an imaginary plane that is perpendicular to an imaginary line angle-bisecting an angle made by sides 115a and 116a.

It is noted that "incidence reference face" corresponds to an imaginary plane which is obtained by imaginarily removing recesses 117 or prismatic projections from incidence face 105.

On the other hand, LED 106 is orientated so that "primary optical axis" is perpendicular to "incidence reference face". It is noted that "primary optical axis" (i.e. optical axis of primary light) is defined as a travelling direction of light at a center of three-dimensional emission flux (primary light) from LED 106, in the instant specification. In addition, "inner propagation optical axis" (i.e. optical axis of inner propagation light) is defined as a travelling direction of light at a center of three-dimensional inner propagation light, in the instant specification.

In FIG. 18a, the imaginary line (perpendicular to the incidence reference face) angle-bisecting an angle made by sides 115a and 116a accords with inner propagation optical axis 120. Emission face 107 of light guide plate 104 is divided into first emission part 107a and second emission part 107b by inner propagation optical axis 120. Attention should be paid to a fact that diagonal 121 extending from a corner of effective light emitting area 106 corresponding to corner portion C1 does not accord with inner propagation optical axis 120 and passes first emission part 107a.

Taking into account that light energy distributes on both side of inner propagation optical axis 120 generally symmetrically, first emission part 107a tends to have a reduced brightness as compared with second emission part 107b. That is, an inner propagation light distributing symmetrically with respect to propagation optical axis 120 gives first emission part 107a an emission amount per unit area smaller than that which is given to emission part 107b. This results in an unbalance in brightness between first and second emission parts 107a and 107b.

FIGS. 19a, 19b illustrate an prior art (third prior art) to overcome such a problem.

FIG. 19a is a plan view of a light guide plate employed in the third prior art and FIG. 19b is a side view of the light guide plate shown in FIG. 19a, as viewed from one side thereof. In addition, FIG. 19c is a side view of the light guide plate shown in FIG. 19a, as viewed from another side thereof. It is noted that the third prior art is disclosed in Document 2 noted below.

According to the third prior art, an incidence face configuration as employed in surface light source device 101 shown in FIGS. 19a and 19b is applied to the surface light source device shown in FIGS. 18a to 18d. In other words, if an incidence face configuration such that inner propagation optical axis 120 is inclined to a long side of effective light emitting area 126 as illustrated in FIGS. 19a and 19b is employed, it is guessed that first and second emission parts 107*a* and 107*b* are supplied with generally the same light quantity.

However, this art can brings a dark portion (hatched portion) 119 in the vicinity of one side 106 in a case where light guide plate 104 is shaped like a slant rectangle (in particular, one having a large length-breadth-ratio).

Document 1; JP-A-2003-331628 (Tokkai-2003-331628)

Document 2; JP-A-1999-133425 (Tokkai-Hei 11-133425)

FIGS. 20*a* to 20*e* illustrate an prior art (forth prior art) to overcome such a shortage.

FIG. 20*a* is a plan view of a light guide plate employed in a forth prior art and FIGS. 20*b*, 20*c* are side views of the light guide plate shown in FIG. 20*a*, as viewed from one and another sides thereof, respectively. Further, FIG. 20*d* is an enlarged partial view of part E in FIG. 20*a* and FIG. 20*e* is an enlarged partial view of part F in FIG. 20*d*, and FIG. 20*f* is a plan view of a light guide plate for showing how unevenness in brightness occurs.

According to the forth prior art, incidence face 105 is provided with triangle-like recesses 125, each having a pair of slopes 123 and 124 which have inclination angles with respect to a incidence reference face different from each other, thereby aiming to provide a uniform brightness.

However, this art involves a problem. Referring to FIG. 22*e*, two light beams 122*a*, 122*b* emitted from LED 106 are parallel to each other, both being perpendicular to the incidence reference face.

Beam 122*a* represents light incident to slope 124 having a small inclination angle and beam 122*b* represents light incident to slope 123 having a large inclination angle. After incidence, beam 122*a* becomes inner propagation light beam 122*a*' and beam 122*b* becomes inner propagation light beam 122*b*'.

Refraction angle of beam 122*b*' at incidence is larger than that of beam 122*a*' (θ1<θ2) because inclination angle of slope 123 is larger than that of slope 124. As a result, light supply to vicinage of 116 is increased.

However, this involves a tendency that effective light emitting area 1026 has dark area 127 appearing in the vicinity of side 115 as shown in FIG. 20*f*, since inner propagation optical axis 120 is urged to be deflected toward side 116 as compared with cases where symmetric slopes are formed. In addition, effective light emitting area 126 tends to has excessively bright area 128 appearing in the vicinity of side 116.

As described above, the above prior arts employ various ideas aiming to uniformalize emission brightness of light guide plate 104, resulting in being not sufficient for uniformalizing emission brightness.

OBJECT AND SUMMARY OF INVENTION

A primary object of the present invention is to provide a light guide plate able to provide a sufficiently uniformalized emission brightness and a surface light source device employing the same, and further to provide a display showing a superior displaying quality by employing the surface light source device.

First, the present invention is applied to a light guide plate comprising an emission face provided by a first major face, a back face provided by a second major face opposite to said emission face, a side peripheral face giving a bridge between said emission face and said back face, and at least one incidence face provided by a part of said side peripheral face, being supplied with primary light from a primary light source disposed opposite to said incidence face.

According to a basic feature of the present invention, said emission face includes a inclined surface which is not parallel with the rest of said emission face and extends at least in the vicinity of said incidence face.

Further, said emission face includes an effective light emitting area which is provisionally divided into first and second regions located on one side and the other side with respect to an optical axis of said primary light, and said inclined surface is inclined as to cause said light guide plate to decrease in thickness as being away in parallel with said incidence face from a part of said side peripheral face correspond to a larger one of said first and second regions.

In a typical case, each of said emission face and said back face is shaped like a rectangle having a pair of long sides and a pair of short sides, said incidence face is formed across a thickness of said light guide plate at at least one corner portion as to extend obliquely with respect to each of said one of said long sides and said one of said short sides.

The present invention is also applied to a surface light source device comprising a light guide plate and a primary light source disposed opposite to said incidence face. According to the present invention, the light guide plate is one provided with the above feature.

In addition, the present invention is also applied to a display comprising a surface light source device and an object-to-be-illuminated for displaying illuminated by said surface light source device. According to the present invention, the surface light source device is one provided with the above feature.

The present invention reduces unbalance in brightness that is apt to appear on an emission face as described previously. As a result, a surface light source device employing a light guide plate in accordance with the present invention is able to provide a uniform emission and a superior emission quality. Further, a display having an object-to-be-illuminated for displaying illuminated by the surface light source device provides a superior displaying quality.

BRIEF DESCRIPTION OF DRAWINGS

FIG. 7*a* is a plan view of a light guide plate employed in a second embodiment;

FIG. 7b is a side view of a light guide plate employed in a second embodiment, as viewed from one side thereof;

FIG. 7c is a side view of a light guide plate employed in a second embodiment, as viewed from another side thereof;

FIG. 7d is a cross section view along A2-A2 in FIG. 7a;

FIG. 7e is a cross section view of a modification of light guide plate employable in the second embodiment in an illustration manner similar to that of FIG. 7d;

FIG. 7f is a cross section view of another modification of light guide plate employable in the second embodiment in an illustration manner similar to that of FIG. 7d;

FIG. 7g is a light guide plate employable in the second embodiment, as viewed from a frontal direction of an incidence face;

FIG. 9a is a plan view of a light guide plate employed in a forth embodiment to which the present invention is applied;

FIG. 9b is a side view of a light guide plate employed in the forth embodiment, as viewed from one side thereof;

FIG. 9c is a cross section view along A3-A3 in FIG. 9a;

FIG. 10a is a plan view of a light guide plate employed in a fifth embodiment to which the present invention is applied;

FIG. 10b is a side view of a light guide plate employed in the fifth embodiment, as viewed from one side thereof;

FIG. 10c is a side view of a light guide plate employed in the fifth embodiment, as viewed from another side thereof;

FIG. 10d is a cross section view along A4-A4 in FIG. 10a;

FIG. 11a is a plan view of a light guide plate employed in a sixth embodiment to which the present invention is applied;

FIG. 11b is a side view of a light guide plate employed in the sixth embodiment, as viewed from one side thereof;

FIG. 11c is a side view of a light guide plate employed in the sixth embodiment, as viewed from another side thereof;

FIG. 11d is an enlarged partial view of a modification of a light guide plate employed in the sixth embodiment;

FIG. 11e is an enlarged frontal view of an incidence face of a light guide plate employed in the sixth embodiment;

FIG. 12f is a cross section view along A5-A5 in FIG. 12a;

FIG. 13a is a plan view of a light guide plate employed in an eighth embodiment to which the present invention is applied;

FIG. 13b is a side view of a light guide plate employed in the eighth embodiment, as viewed from one side thereof;

FIG. 13c is a side view of a light guide plate employed in the eighth embodiment, as viewed from another side thereof;

FIG. 14a is a plan view of a light guide plate employed in a ninth embodiment to which the present invention is applied;

FIG. 14b is a side view of a light guide plate employed in the ninth embodiment, as viewed from one side thereof;

FIG. 14c is an enlarged partial view of the light guide plate shown in FIG. 14a;

FIG. 14d is a side view of a light guide plate employed in the nineth embodiment, as viewed from another side thereof;

FIG. 15a is a plan view of a light guide plate employed in a tenth embodiment to which the present invention is applied;

FIG. 15b is a side view of a light guide plate employed in the tenth embodiment, as viewed from one side thereof;

FIG. 15c is an enlarged partial view of the light guide plate shown in FIG. 15b;

FIG. 15d is a side view of a light guide plate employed in the tenth embodiment, as viewed from another side thereof;

FIG. 15e is a side view of a light guide plate shown in FIG. 15d;

FIG. 18a is a plan view of a light guide plate employed in a second prior art;

FIG. 18b is a side view of the light guide plate shown in FIG. 18a, as viewed from one side thereof;

FIG. 18c is a side view of the light guide plate shown in FIG. 18a, as viewed from another side thereof;

FIG. 18d is an enlarged partial view of part D in FIG. 18a;

FIG. 19a is a plan view of a light guide plate employed in a third prior art;

FIG. 19b is a side view of the light guide plate shown in FIG. 19a, as viewed from one side thereof;

FIG. 19c is a side view of the light guide plate shown in FIG. 19a, as viewed from another side thereof;

FIG. 20a is a plan view of a light guide plate employed in a forth prior art;

FIG. 20b is a side view of the light guide plate shown in FIG. 20a, as viewed from one side thereof;

FIG. 20c is a side view of the light guide plate shown in FIG. 20a, as viewed from another side thereof;

FIG. 20d is an enlarged partial view of part E in FIG. 20a;

FIG. 20e is an enlarged partial view of part F in FIG. 20d; and,

FIG. 20f is a plan view of a light guide plate for showing how unevenness in brightness occurs.

EMBODIMENT

First Embodiment (Surface Light Source Device/Display Provided with the Same)

FIGS. 1a to 1d and 2 illustrate surface light source device 1 and display 2 provided with the same.

Figure 1:
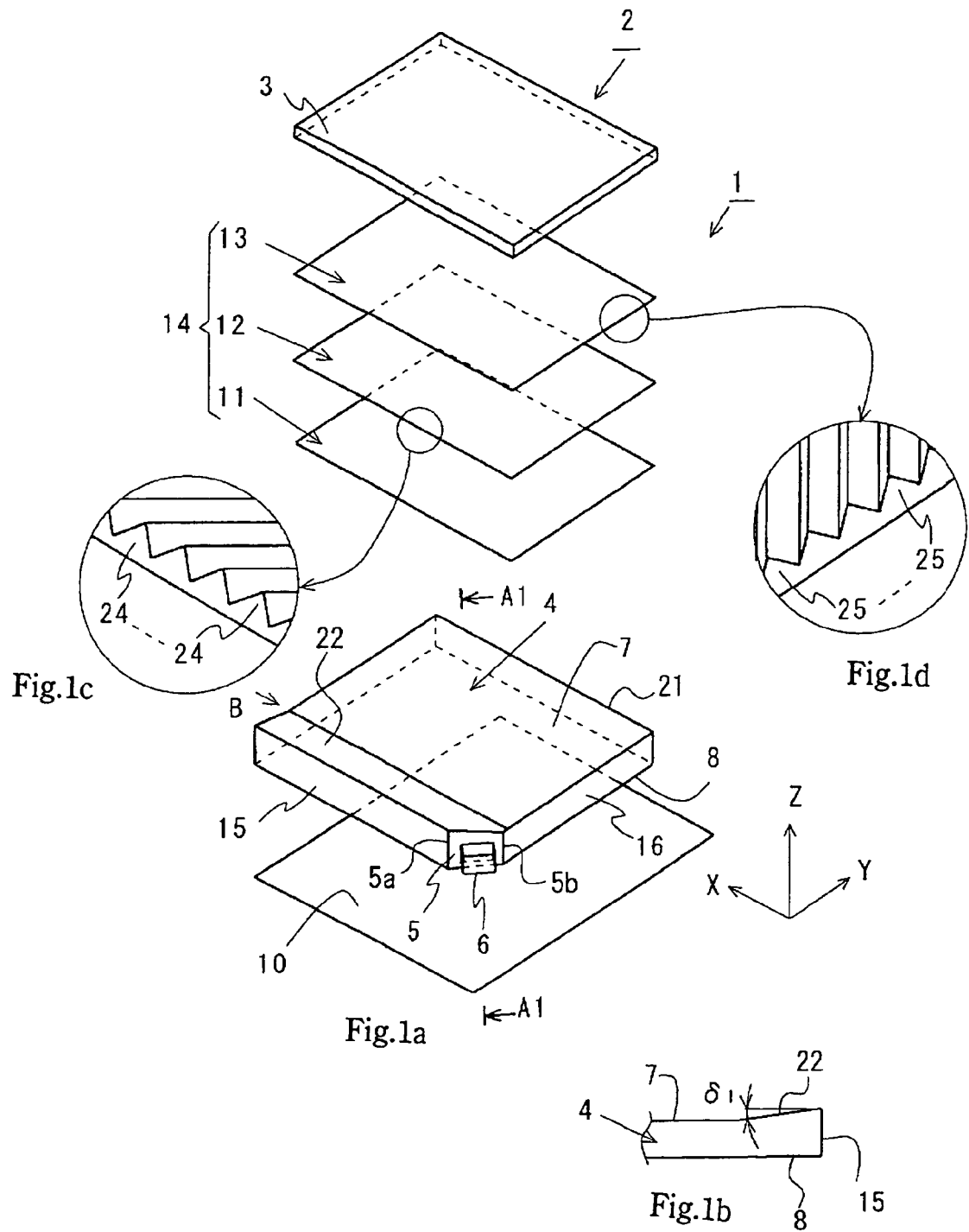
FIG. 1*a* is an exploded perspective view of a surface light source device and a display employing the same to which the present invention is applied.
FIG. 1*b* is an enlarged partial side view in direction B shown in FIG. 1*a*.
FIG. 1*c* is an enlarged partial view of a first prism sheet employed in a first embodiment.
FIG. 1*d* is an enlarged partial view of a second prism sheet employed in a first embodiment.

FIG. 1a is an exploded perspective view of these and FIG. 1b is an enlarged partial side view in direction B shown in FIG. 1a. FIG. 1c is an enlarged partial view of a first prism sheet employed in the first embodiment and FIG. 1d is an enlarged partial view of a second prism sheet employed in the first embodiment. In addition, FIG. 2 is a cross section view along A1-A1 in FIG. 1a.

Figure 2:
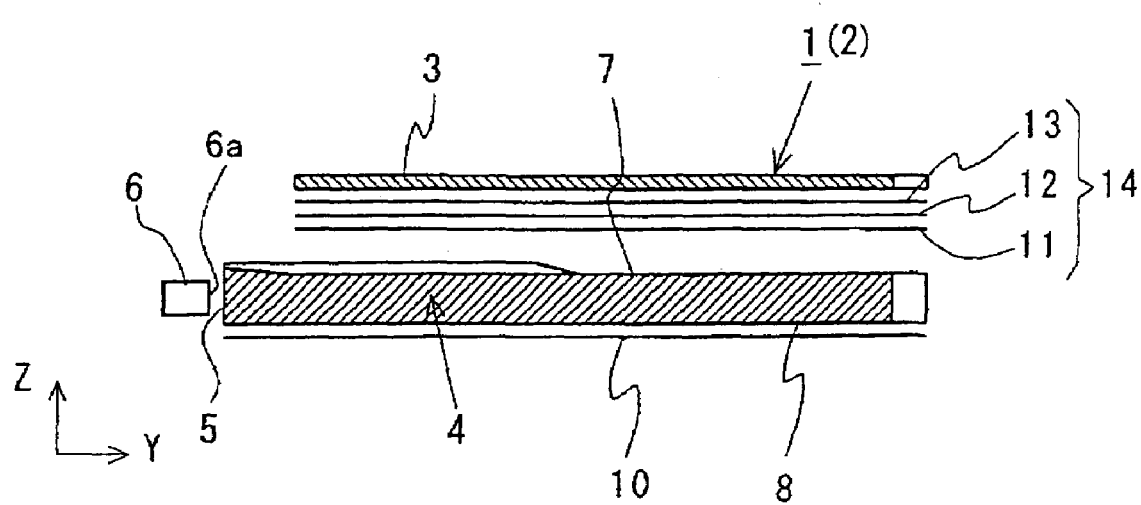
FIG. 2 is a cross section view along A1-A1 in FIG. 1*a*.

It is noted that +Z-direction is defined as upward direction and +Y-direction is defined as right-hand direction in FIG. 2 for the sake of expressing directions, as illustrated in FIG. 2.

Referring to these illustrations, display 2 comprises surface light source device 1 and LCD panel (object-to-be-illuminated) 3 backlighted by the device 1. Surface light source device 1 is provided with thin light guide plate 4, LED (primary light source) 6 disposed opposite to incidence face 5, light reflection member 10 and light control members 14. Light control members 14 include members such as light diffusion sheet 11, first and second prism sheets 12, 13.

Light guide plate 4 has two major faces, one providing emission face 7 and the other providing back face 8. Reflection member 10 is disposed along back face 8 and light control members 14 are disposed along emission face 7.

It is noted that LED 6 preferably supplies white light, consisting of blue light LED and fluorescent material. LED 6 may be three-color-mixing-type white light LED employing RGB light emitting portions within one package, or may be white light LED, arranged near to incidence face 5, employing LEDs respectively emitting R, G and B arranged near to each other so that three colors are mixed.

Alternatively, light sources emitting light other than white light or light sources other than LED may be disposed in the vicinity of the incidence face.

(Light Guide Plate)

Figure 3:
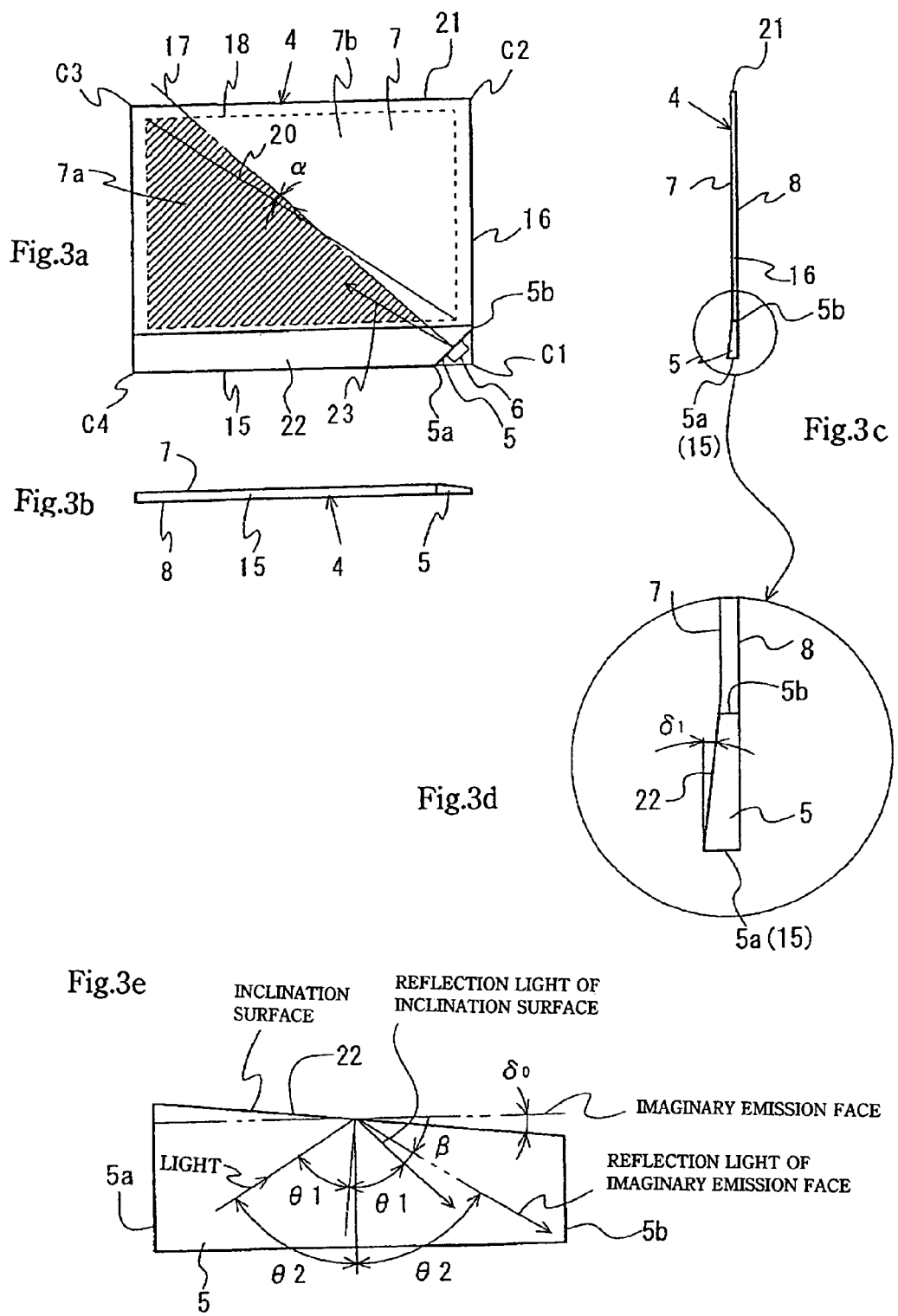
FIG. 3*a* is a plan view of a light guide plate and LED employed in the first embodiment.
FIG. 3*b* is a side view of the light guide plate shown in FIG. 3*a*, as viewed from one side thereof.
FIG. 3*c* is a side view of the light guide plate shown in FIG. 3*a*, as viewed from another side thereof.
FIG. 3*d* is a partial enlarged illustration of in FIG. 3*c*.
FIG. 3*e* is an enlarged frontal view of an incidence face of the light guide plate shown in FIG. 3*a*.

Light guide plate 4 is made of a light permeable material such as polymethyl methacrylate (PMMA), polycarbonate (PC) or cycloolefin-type resin. As shown in FIGS. 1a and 3a, light guide plate 4 has four corner portions C1 to C4 one of which corner portion C1 has a cut-off configuration to provide incidence face 5.

Incidence face 5 is shaped like a rectangle extending obliquely at generally the same angle with respect to both side faces (one side face 15 and the other side face 16) adjacent to incidence face 5, being opposite to emission portion 6a of LED 6 to provide a light receiving area not smaller than an emission area of emission portion 6a.

Emission face 7 is shaped like a rectangle having a side corresponding to side face 15 and another side corresponding to side face 16, wherein the former is longer than the latter side. Primary optical axis of light emitted from LED 6 is perpendicular to incidence face 5 and inclined toward side face 16 at angle α with respect to diagonal 20 of effective light emitting area 18.

It is needless to say that side faces 15, 16, 21 and incidence face 5 are provided by parts of "side peripheral face" of light guide plate 4. The "side peripheral face" is a face which gives a bridge between emission face 7 and back face 8, going around along edges of emission face 7 and back face 8 like an endless band (a rectangular endless band, in this embodiment).

As described already, effective light emitting area 18 is an emission part which is effectively used for illuminating LCD panel 3 or the like, being required to provide a two-dimensionally uniform illumination light. The rest part, from which effective light emitting area 18 is excluded, of emission face 7 may be called "picture frame part", usually being covered by a member, not shown.

It is noted that primary optical axis 17 is illustrated as a straight line perpendicular to incidence face 5 in FIG. 3a. Provided that light guide plate 4 is flat without inclined surface 22 described later (See FIGS. 3d, 3e), it accord with an inner propagation optical axis.

To the contrary, this embodiment employs emission face 7 on which inclined surface 22 extends along and in the vicinity of side face 15. Inclined surface 22 is inclined as to cause plate-thickness to decrease as being away from side face 15, namely, toward opposite side face 21.

Incidence face 5 has an end portion, denoted by reference symbol 5b, near to side face 16, and, if a straight line is drawn from this end portion 15b in parallel to incidence face 15, inclined surface 22b is formed as to terminate at the straight line or as to extend over the straight line.

FIGS. 3d and 3e illustrate how inclination surface 22 is inclined in a plane of incidence face 5 and cross sections parallel with incidence face 5. As illustrated therein, inclination surface 22 provides a "down-ward slope" of inclination angle δ0 that descends away from side face 15. In other words, this inclination causes light guide plate 4 to have a gradually decreasing thickness from end portion 5a on the side of side face 15 toward end portion 5b on the side of side face 16.

Now paying attention to primary optical axis 17 shown in FIG. 3a, primary optical axis 17 runs perpendicularly to incidence face 5 from a generally center portion of incidence face 5, allowing to be regarded as a straight line dividing provisionally effective light emitting area 18 into first emission region 7a (hatched part) located on the right hand second emission region 7b located on the left hand.

Therefore is can be said that inner propagation light is distributed to first and second emission regions 7a, 7b. It is noted that effective light emitting area 18 is set as to avoid inclination surface 22 from included therein in this embodiment.

Comparing first emission region 7a with second emission region 7b, it can be said that first emission region 7a is a region including many comparatively long light guiding paths while second emission region 7b is a region including many comparatively short light guiding paths Accordingly, if effects of inclination surface 22 are not considered, first and second emission regions 7a, 7b are supplied with approximately the same quantity of light, with the result first emission region 7a is apt to be darker than second emission region 7b. In other words, an brightness unbalance arises between first emission region 7a and second emission region 7b.

However, effects of inclination surface 22 should be considered actually. Inclination surface 22 functions as to relax or compensate the above brightness unbalance. As shown in FIG. 3e, some of the inner propagation light generated by light entering into light guide plate 4 through incidence face 5 is inner-reflected by inclination surface 22 in the vicinity of incidence face 5.

In addition, this gives a reflection angle smaller than that of a case (where reflection occurs at emission face 7 parallel with back face 8) without inclination surface 22 (θ2>θ1).

As a result, light guide plate 4 employed in this embodiment makes inner propagation light less guided to the side of second emission regions 7b as compared with the case of conventional light guide plate 104 which is not provided with inclination surface 22. In other words, an increased proportion of light is emitted from first emission region 7a. This relaxes or compensates the above brightness unbalance.

Saying in other ways, inclination surface 22 functions as to deflect inner propagation optical axis 23 toward the side of first emission region 7a, thereby reducing difference in emission light quantity per unit are between first and second emission regions 7a, 7b. This makes brightness unevenness inconspicuous on emission face 7, in particular, within effective light emitting area 8.

It is noted that back face 8 and/or emission face 7 may be provided with an emission-promotion means, not shown. The emission-promotion means may be, for instance, rough surface (such as satin pattern), hemisphere-like, pyramid-like or cone-like projections or recesses. Further, light guide plate 4 may be provided with a light scattering ability inside.

(Reflection Sheet)

Light reflection sheet 10 is generally the same shape and size as those of rectangular back face 8, functions of which are known well. That is reflection sheet 10 functions as to return light leaked through back face 8 into light guide plate 4 through reflection. It is noted that light reflection sheet 10 may be substituted by a reflection surface provided by housing accommodating members including light guide plate 4.

(Light Control Member)

Light control members 14 employed in this embodiment include light diffusion sheet 11, first and second prism sheets 12, 13. These elements have generally the same shape and size as those of effective light emitting area 18 of light guide plate 4. As illustrated, Light control members 14 are rectangular. Structure and functions of light diffusion sheet 11, first and second prism sheets 12, 13 are known well.

Diffusion sheet 11 is made of a light permeable material (such as PET or PC), provided with a roughened surface, transmitting and diffusing light. First and second prism sheets 12, 13 are made of a light permeable material (such as PET, PMMA, PC or UV-setting resin).

Prism sheet 12 has an upper face (outer face) provided with many prismatic projections 24 with triangle-like cross section. Prismatic projections 24 run in a direction generally perpendicular to incidence face 5. Prism sheet 13 has an upper face (outer face) provided with many prismatic projections 25 with triangle-like cross section. Prismatic projections 25 run in a direction generally parallel with incidence face 5, namely, generally vertical to the running direction of prismatic projections 24.

These prism sheets 12, 13 gather effectively light emitted from effective light emitting area 18, after being diffused by diffusion sheet 11, around an approximately normal direction of effective light emitting area 18, for effectively illuminating LCD panel 3.

(Effect/Advantage of Surface Light Source Device and Display)

(Effect/Advantage of Surface Light Source Device and Display)

As described previously, since surface light source device 1 according to this embodiment employs light guide plate 4 provided with inclination surface 22 formed on emission face 7 in the vicinity of incidence face 5, emission face 7 (in particular, effective light emitting area 18) of light guide plate 4 gives a uniform emission brightness, illuminating LCD panel 3 uniformly. As a result, LCD panel 3 has a superior displaying quality.

(Modifications)

Surface light source device 1 and Display 2 in accordance with the embodiment allow modifications such as followings.

(1) Some or all of light control members 14 disposed along emission face 7 may be changed or omitted. For example, prism sheet 12 may be omitted. In this case, prismatic projections (not shown) running in a direction generally perpendicular to incidence face 5 may be formed on back face 8 and/or emission face 7 of light guide plate 4. Such prismatic projections gives an enforced directivity to emission from emission face 7, increasing light components travelling in directions around a normal direction of effective light emitting area 18. In addition, prismatic projections of prism sheet 13 are formed on a lower face (opposite to light guide plate 4), running in a direction is vertical to a running direction of prism projections formed on light guide plate 4.

(2) If prismatic projections are formed on back face 8 and/or emission face 7 of light guide plate 4, they may run in a direction not vertical to incidence face 5, such as direction parallel to side face 15 or 16. Alternatively, repeating prismatic rows may be formed as to distribute radially. In general, running directions of prismatic projections formed on a light guide plate or prism sheet, may be appropriately under consideration of viewing field angle and others.

(3) Thickness of light guide plate 4 may decrease gradually away from incidence face 5. In this case, a cross section along A1-A1 in FIG. 1a gives a wedge-like shape.

Light incidence portion (incidence face 5) may be formed at a plurality of corners, for example, two corners CI and C2. In this case, LED 6 is disposed opposite to each incidence face 5. Inclination surfaces 22 are formed on emission face 7 in the vicinity of incidence face 5 as to extend along side faces 15 and 21, respectively. In this case, inclination surface 22 formed along side face 15 involves a gradual thickness decrease away from side face 15. On the other hand, inclination surface 22 formed along side face 21 involves a gradual thickness decrease away from side face 21.

Thickness may be constant except in an area of inclination surface 22. Alternatively, a tendency of decreasing thickness away from side face 16 may be added. In any case, light guide plate 4 preferably has a shape symmetric with respect to a straight which extends perpendicularly to side face 16 as to pass a center position regarding a length direction of side face 16.

Incidence faces 5 may be formed at two corners CI and C4. In this case, inclination surface 22 is formed on emission face 7 in the vicinity of incidence face 5 as to extend along side face 15 as above and LEDs 6 are disposed opposite to incidence faces 5, respectively. This modification allows light guide plate 4 to have a gradually decreasing thickness away from side face 15 to side face 21.

This corresponds to a fact that inclination surface 22 extends from side face 15 and reaches side face 21. Alternatively, inclination surface 22 may extend only in a limited range of a predetermined distance from side face 15 and give a constant thickness the rest from there to side face 21.

(4) Incidence faces 5 may be formed at three or four of corners CI to C4 and LEDs 6 are disposed opposite to incidence faces 5, respectively. In this case, light guide plate 4 has a constant thickness except in an area of inclination surface 22.

Figure 4:
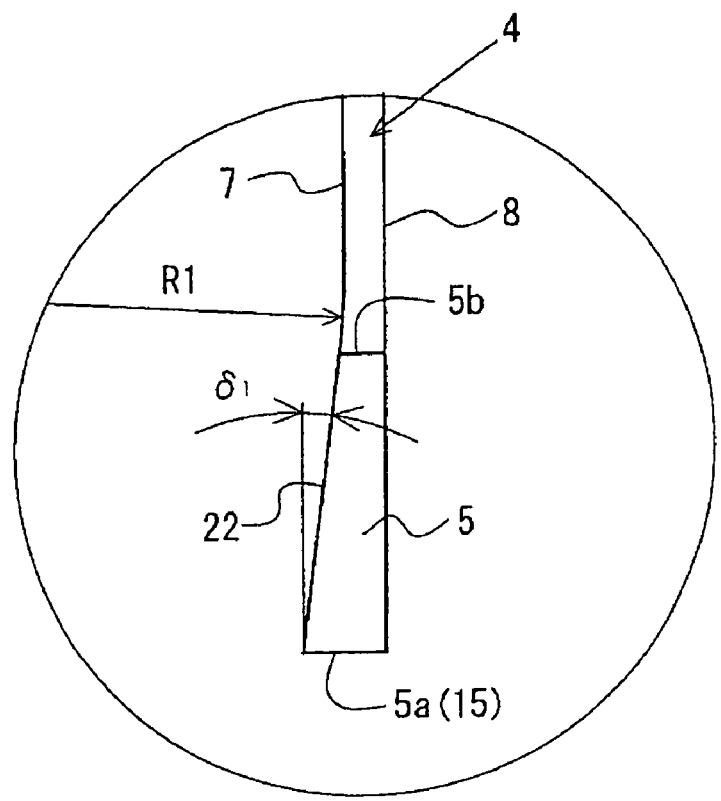
FIG. 4 shows a modification of light guide plate employable in the first embodiment in an illustration manner similar to that of FIG. 3*d*.

(5) As shown in FIG. 4, emission face 7 may employ a smoothly curved surface (such as curved surface of curvature radius R1) connecting inclination surface 22 to emission face 7.

Figure 5:
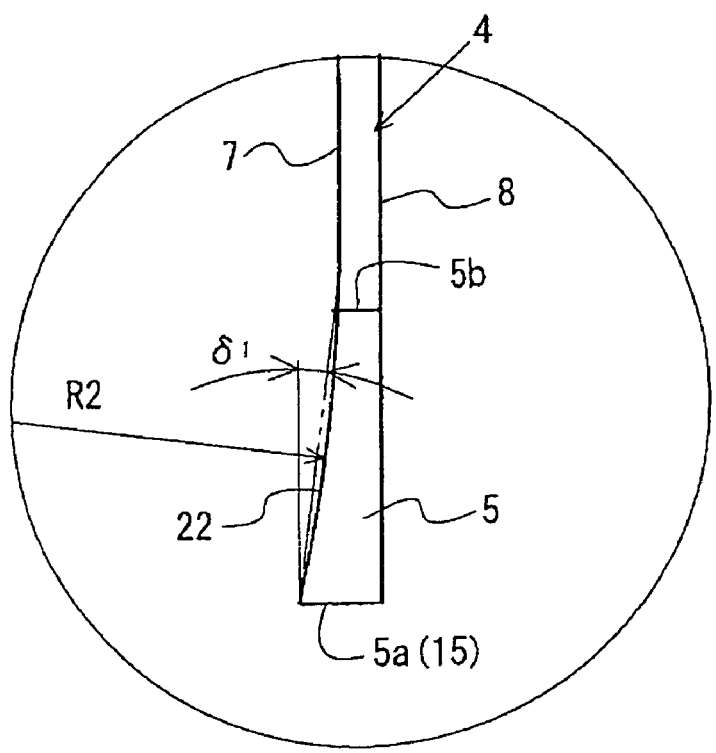
FIG. 5 shows another modification of light guide plate employable in the first embodiment in an illustration manner similar to that of FIG. 3*d*.

(6) As shown in FIG. 5, inclination surface 22 22 may be overall a smoothly curved surface (such as curved surface of curvature radius R2).

(7) In the above-described embodiment, incidence face 5 is formed as to make an equal angle with respect to side faces 15 and 16 providing corner portion C1. However, this does not limit the scope of the present invention.

For example, in order to correct deviation between an imaginary line angularly bisecting corner portion C1 and another imaginary line angularly bisecting a corner, which corresponds to corner portion C1, of effective light emitting area 18, incidence face 5 may be formed as to make angles different from each other with respect to side face 15 and 16.

Figure 6A:
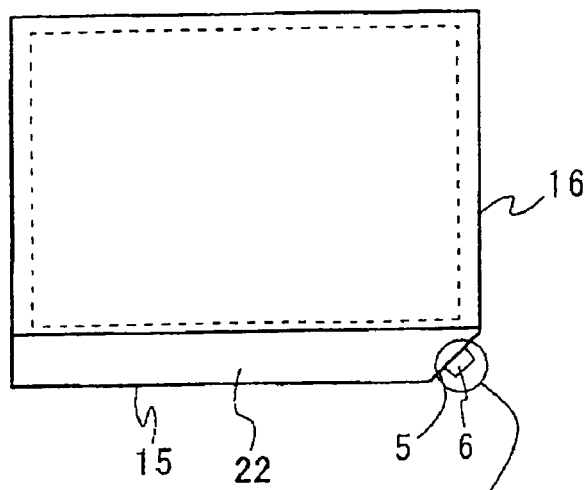
FIG. 6*a* shows still another modification of light guide plate employable in the first embodiment in an illustration manner similar to that of FIG. 3*d*.
Figure 6B:
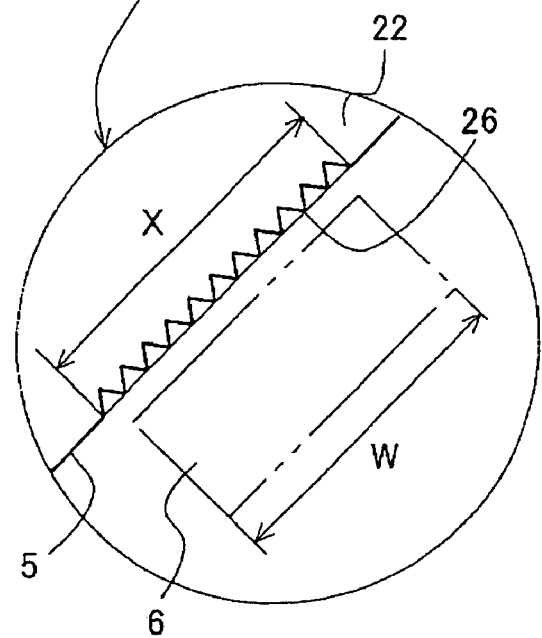
FIG. 6*b* is an enlarged partial illustration of FIG. 6*a*, giving an enlarged illustration of the vicinity of an incidence face.
Figure 6C:
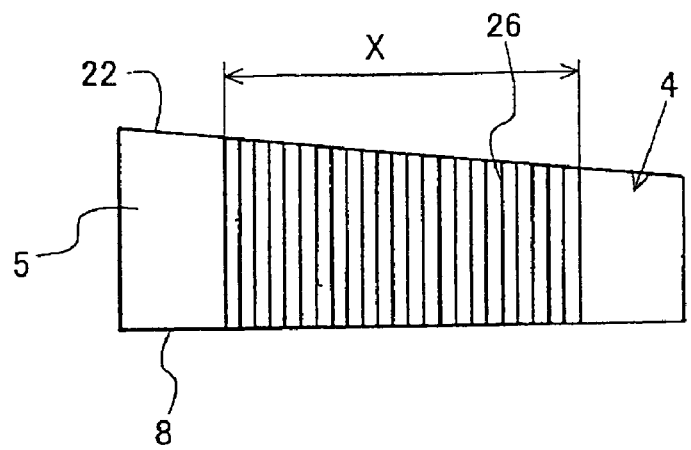
FIG. 6*c* is an enlarged frontal view of the incidence face of the light guide plate shown in FIG. 6*a*.

(8) As shown in FIGS. 6a to 6c, incidence face 5 may be provided with prismatic projections 26 (or recesses) each of which has a triangle-like planar shape (in particular, please see FIG. 6b). In this case, an angularly expanded inner propagation light is produced. Prismatic projections 26 formed on incidence face 5 preferably cover a width range that is opposite to LED 6 and generally equal to or larger than emitting width W of LED 6 (W≦X). It is noted that projections 26 are formed as to extend in a thickness direction from emission face 7 to back face 8 on incidence face 5. Projections 26 may cover incidence face 5 overall.

Second Embodiment

FIGS. 7a to 7g illustrate the second embodiment of the present invention. FIG. 7a is a plan view of a light guide plate employed in the second embodiment and FIGS. 7b, 7c are side views of the light guide plate, as viewed from one and another sides thereof, respectively. FIG. 7d is a cross section view along A2-A2 in FIG. 7a and FIG. 7e is a cross section view of a modification of light guide plate employable in the second embodiment in an illustration manner similar to that of FIG. 7d. FIG. 7f is a cross section view of another modification of light guide plate employable in the second embodiment in an illustration manner similar to that of FIG. 7d. Finally, FIG. 7g is a light guide plate employable in the second embodiment, as viewed from a frontal direction of an incidence face.

Referring to these illustrations, inclination surface 27 is formed on emission face 7 in the vicinity of incidence face 5 as to extend over side faces 15 and 16. That is, connection portion connecting inclination surface 27 with a part of emission face 7 parallel to back face 8 is located the outside of effective light emitting area 18, extending obliquely from the side of side face 15 to the side of side face 16.

Inclination surface 27 ascends (with an increasing plate thickness) at inclination angle δ3, in the side of side face 15, from connection portion 28 toward incidence face 5 while ascending (with an increasing plate thickness) at inclination angle δ4 (δ4>δ3), in the side of side face 16, from connection portion 28 toward incidence face 5.

viewing from a normal direction of incidence face 5 (direction of arrow D shown in FIG. 7a), inclination surface 27 looks as to cause thickness to decrease gradually at inclination angle δ0 from the side of side face 15 to the side of side face 16.

Inclination surface 27 has inclination angle δ0 at incidence face 5 is generally the same as that of the first embodiment, inner-reflecting light from LED 6 in generally the same way as that of the first embodiment.

It is noted that corner portion C1 is cut off in a range of c to provide incidence face 5 while connection portion 28 extends in a range of a in the side of side face 16 and in a range of b in the side of side face 15 (a<b).

Figure 16A:
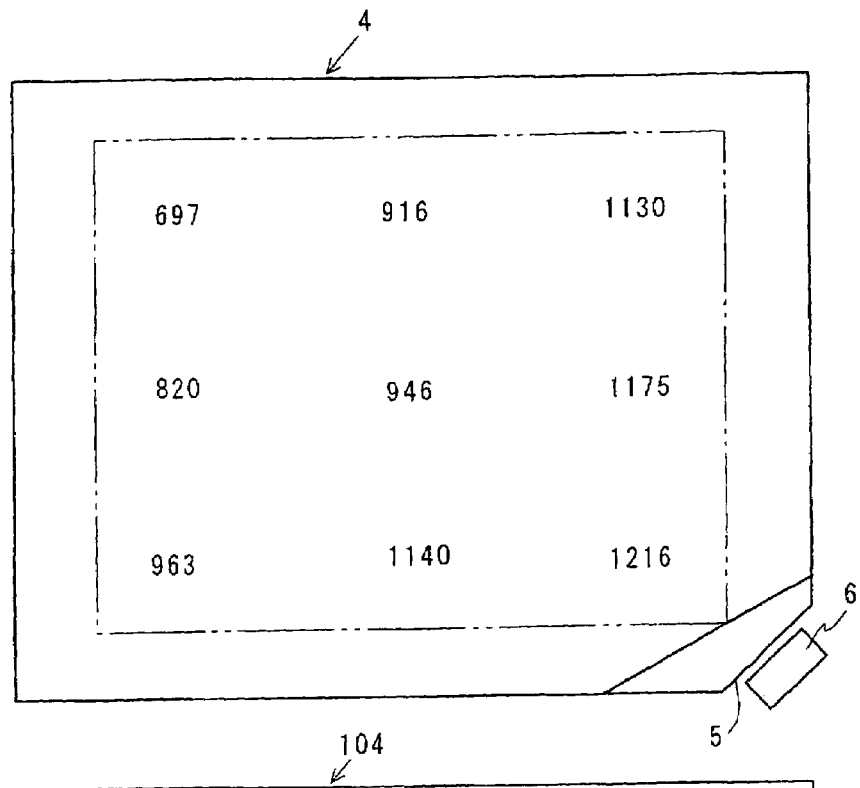
FIG. 16a is a diagram showing a measurement result of emission intensity for a light guide plate to which the present invention is applied.
Figure 16B:
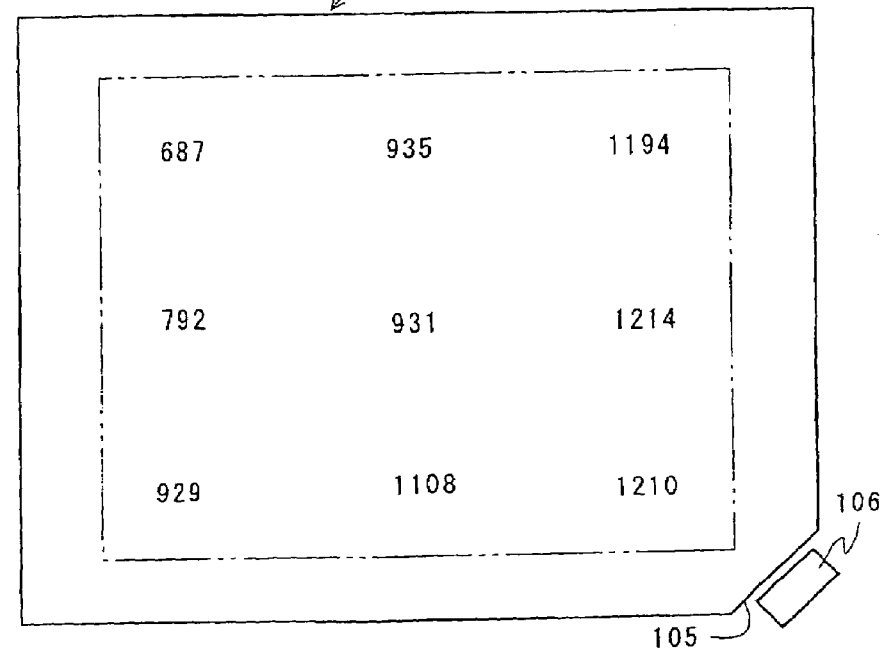
FIG. 16b is a diagram showing a measurement result of emission intensity for a light guide plate in accordance with a prior art.
Figure 17:
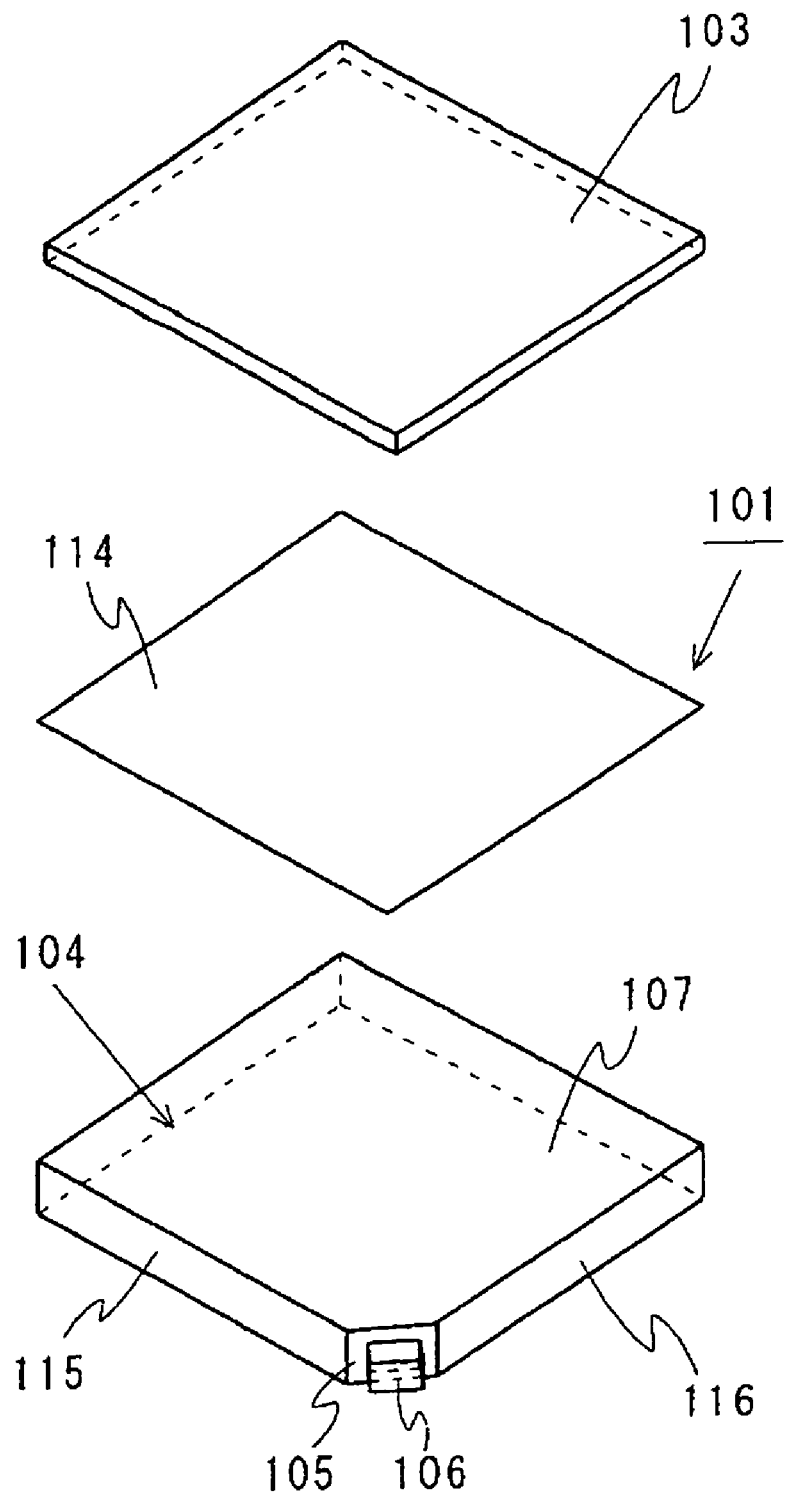
FIG. 17 is an exploded perspective view of a surface light source device in accordance with a first prior art.

FIGS. 16a and 16b are diagrams sowing measurement results of emission intensity for light guide plate 4 to which the present invention is applied and light guide plate 104 in accordance with a prior art. FIG. 16a illustrates emission brightness (unit; $cd/m^2$) of light guide plate 4 for measurement points (nine points), respectively. FIG. 16b illustrates emission brightness (unit; $cd/m^2$) of light guide plate 104 having no inclination surface for measurement points (nine points) respectively.

It is noted that light guide plate 4 having provided the results illustrated in FIG. 16a gives a=2 mm, b=8 mm, c=5 mm, and is 0.4 mm in thickness in effective light emitting area 18 and has the maximum thickness of 0.6 mm at incidence face 5.

On the other hand, light guide plate 104 having provided the results illustrated in FIG. 16b has no inclination surface and is provided with a constant thickness of 0.46 mm. Incidence face 105 is provided by cutting off corner portion C1 with the same c as c of incidence face 5.

Both results of FIGS. 16a and 16b show a uniformalized emission brightness such that light guide plate 4 of this embodiment gives a reduced emission brightness in second emission region 7b and an increased emission brightness in first emission region 7a, as compared with conventional light guide plate 104.

It is noted that light guide plate 4 of this embodiment has incidence face 5, shown in FIG. 7g, of a shape like that of the first embodiment shown in FIG. 3e, functioning as to promote that light is directed to the side of first emission region 7a.

Accordingly, it is expected that light guide plate 104 of the first embodiment has a emission brightness uniformalization effect like that shown in FIG. 16a. In other words, generally the same emission brightness uniformalization effect is expected by both the first embodiment and this embodiment.

In addition, inclination surface 27 is preferably connected to emission face 7 smoothly by a curved surface (such as curved surface of curvature radius R3) as shown in FIG. 7e in this embodiment, too.

Further to this, inclination surface 27 may be formed of a smoothly curved surface (such as curved surface of curvature radius R4) as shown in FIG. 7f, instead of a planar surface as shown in FIG. 7d.

Third Embodiment

Figure 8:
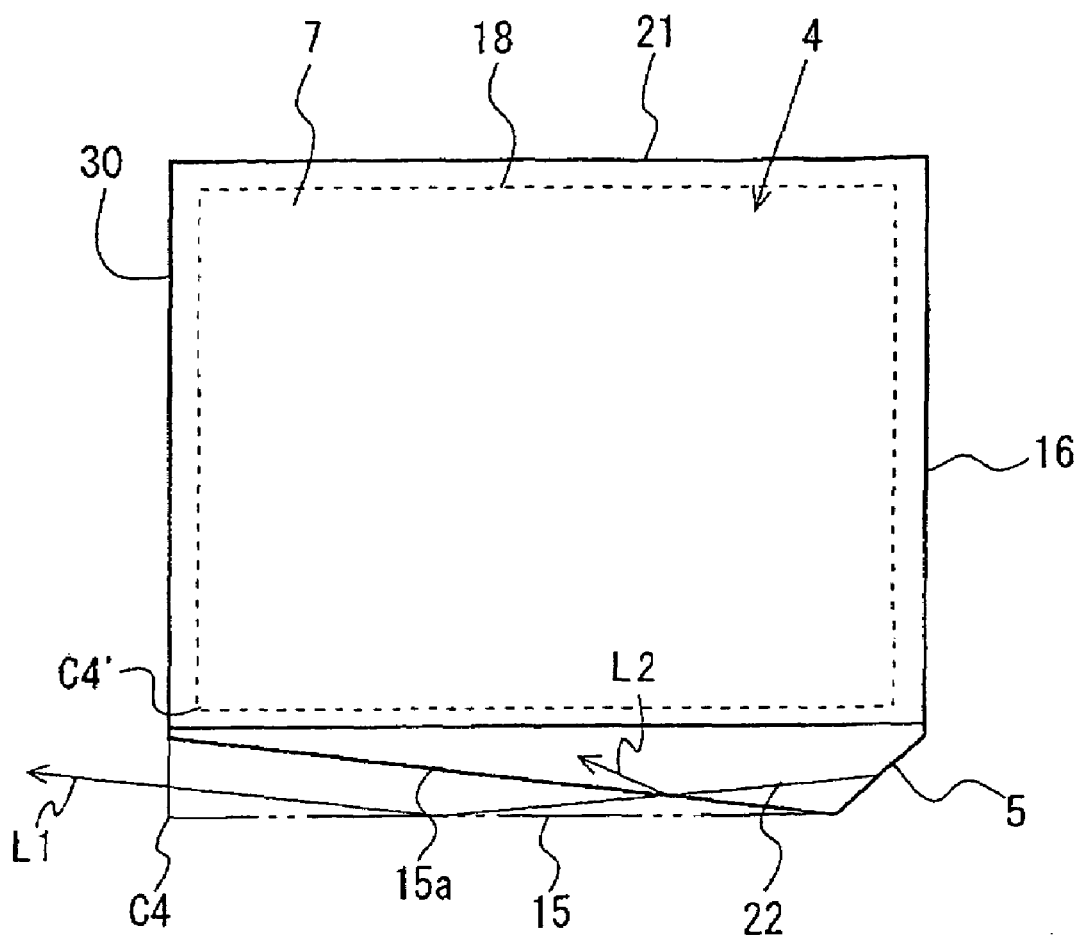
FIG. 8 is a plan view of a light guide plate employed in a third embodiment.

FIG. 8 illustrates light guide plate 4 of the third embodiment to which the present invention is applied, corresponding to a modification of light guide plate 4 of the first embodiment.

According to this modification, side face 15a (the third embodiment) is formed instead of side face 15 (the first embodiment). Side face 15a corresponding to a side face obtained by cutting off side face 15 with an increasing depth away from incidence face 5 in the outside of effective light emitting area 18. Incidence face 5 is formed as to make generally the same angle with respect to side faces 15 and 16.

In FIG. 8, provided that this cutting off does not formed, a remarkable light L1 will be emitted from side face 30 at the outside of effective light emitting area 18. Side face 15a prevents this, inner-reflecting light obliquely (to the side of effective light emitting area 18) like light L2. This light avoids the vicinity of corner portion C4' of effective light emitting area 18 corresponding to corner portion C4 from having a dark portion.

As a result, light guide plate 4 realizes a more positive emission brightness uniformalization effect obtained by synergism of inclined side face 15a and inclination surface 22.

Forth Embodiment

FIGS. 9a to 9c illustrate light guide plate 4 of the forth embodiment to which the present invention is applied, corresponding to another modification of light guide plate 4 of the first embodiment.

FIG. 9a is a plan view light guide plate 4 and FIGS. 9b, 9c is side views of light guide plate 4, as viewed from the sides of side face 16 and side face 15 thereof, respectively. FIG. 9c is a cross section view along A3-A3 in FIG. 9a.

Light guide plate 4 illustrated therein has planar portion (planar portion parallel with effective light emitting area 18) 31 of a constant width w1 is formed along side face 15 at an end portion of inclination surface 22 on the side of side face 15. This enables planar portion 31 formed in the outside of effective light emitting area 18 to be utilized for positioning when positioning (assembling) is carried out, with upper and lower faces of light guide plate 4 being sandwiched by a member such as frame.

As a result, assembling of light guide plate 4 and members other than light guide plate 4 is made easy and handling of light guide plate 4 is made easy, too.

Except for planar portion 31, light guide plate 4 of this embodiment is tha same as the first embodiment. Therefore generally the same effects as those of the first embodiment are obtained. In addition, surface light source device 1 and display 2 employing light guide plate 4 obtain generally the same effects as those of surface light source device 1 and display 2 employing light guide plate 4 in accordance with the first embodiment.

Fifth Embodiment

FIGS. 10a to 10d illustrate light guide plate 4 of the fifth embodiment to which the present invention is applied, corresponding to still another modification of light guide plate 4 of the second embodiment. FIG. 10a is a plan view light guide plate 4 and FIGS. 10b, 10c are side views of light guide plate 4, as viewed from the sides of side face 15 and side face 16 thereof, respectively. FIG. 10d is a cross section view along A4-A4 in FIG. 9a.

Light guide plate 4 illustrated therein has planar portion (planar portion parallel with effective light emitting area 18) 32 of a constant width w2 is formed along incidence face 5 at an end portion of inclination surface 27 on the side of incidence face 5.

This enables planar portion 32 formed in the outside of effective light emitting area 18 to be utilized for positioning. As a result, assembling of light guide plate 4 and members other than light guide plate 4 is made easy and handling of light guide plate 4 is made easy, too.

Except for planar portion 32, light guide plate 4 of this embodiment is tha same as the second embodiment. Therefore generally the same effects as those of the second embodiment are obtained. In addition, surface light source device 1 and display 2 employing light guide plate 4 obtain generally the same effects as those of surface light source device 1 and display 2 employing light guide plate 4 in accordance with the second embodiment.

Sixth Embodiment

FIGS. 11a to 11e illustrate light guide plate 4 of the sixth embodiment to which the present invention is applied. FIG. 11a is a plan view light guide plate 4 and FIGS. 11b, 11c are side views of light guide plate 4, as viewed from the sides of side face 15 and side face 16 thereof, respectively.

Light guide plate 4 illustrated therein has inclination surface 33 which is formed on emission face 7 and on the outside of effective light emitting area 18 along side face 16 as to increase plate thickness away from side face 16 toward effective light emitting area 18.

Inclination surface 33 has inclination angle δ1, which may be generally the same as inclination angle δ1 of inclination surface 22. Inclination angle δ0 of inclination surface 33 at incidence face 5 is generally the same as that of light guide plate 4 in accordance with the first embodiment.

It is noted that inclination surface 33 ascends from a position (on emission face 7), which passes end portion 15a on the side of side face 15 and corresponds to a line parallel to side face 16, to side face 16. In other words, light guide plate 4 has a decreasing thickness away from the position corresponding to the above line toward a location corresponding to side face 16 (See FIG. 11a).

This light guide plate 4 can obtain generally the same effects as those of the first embodiment. In addition, surface light source device 1 and display 2 employing light guide plate 4 can obtain generally the same effects as those of surface light source device 1 and display 2 employing light guide plate 4 in accordance with the first embodiment.

It is noted that this embodiment allows inclination surface 33 may be, instead of a flat surface as shown in FIG. 11b, a smoothly curved surface (such as curved surface of curvature radius R5) as shown in FIG. 11d.

Seventh Embodiment

Figure 12A:
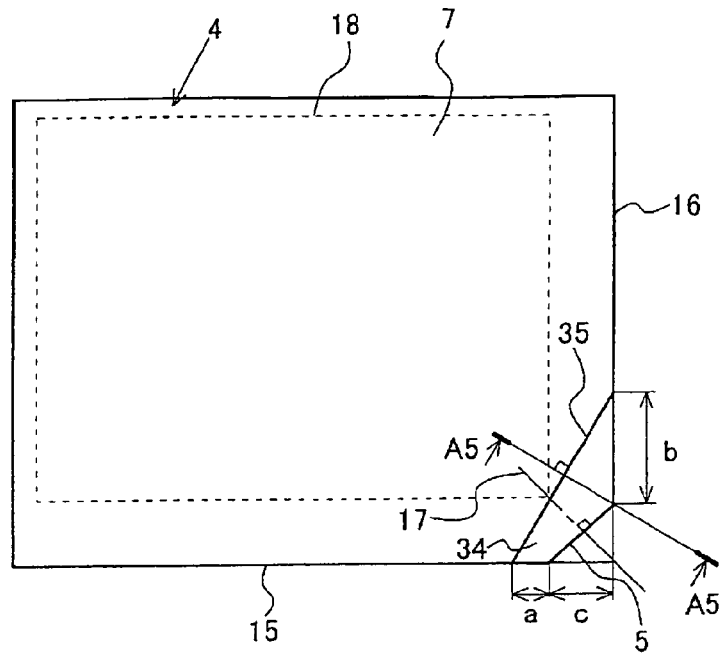
FIG. 12a is a plan view of a light guide plate employed in a seventh embodiment to which the present invention is applied.
Figure 12D:
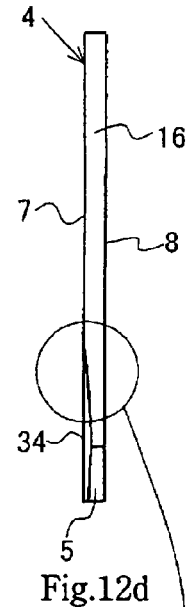
FIG. 12d is a side view of a light guide plate employed in the seventh embodiment, as viewed from another side thereof.
Figure 12B:
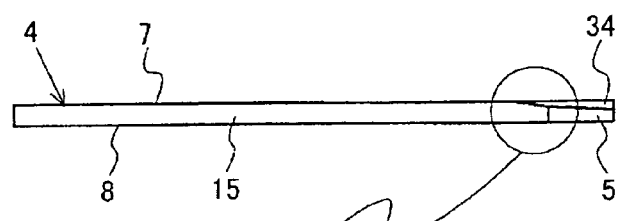
FIG. 12b is a side view of a light guide plate employed in the seventh embodiment, as viewed from one side thereof.
Figure 12C:
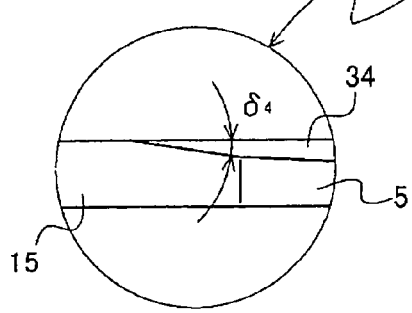
FIG. 12c is an enlarged partial view of a light guide plate employed in the seventh embodiment.
Figure 12F:
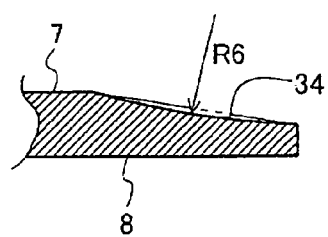
Figure 12E:
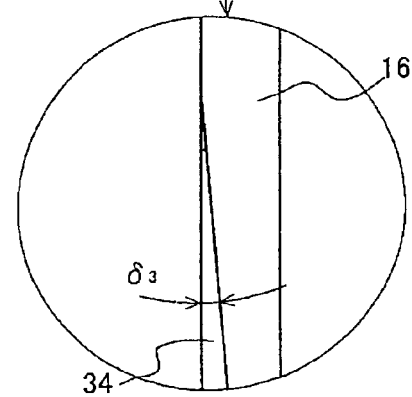
FIG. 12e is an enlarged partial view of the light guide plate shown in FIG. 12d.

FIGS. 12a to 12f illustrate light guide plate 4 of the seventh embodiment to which the present invention is applied. FIG. 12a is a plan view light guide plate 4 and FIG. 12b is side view of light guide plate 4, as viewed from the side of side face 15 thereof and FIG. 12c is a partially enlarged illustration of FIG. 12b, and FIG. 12d is side view of light guide plate 4, as viewed from the side of side face 16 thereof, and further, FIG. 12e is an enlarged partial view of the light guide plate shown in FIG. 12d. In addition, FIG. 12f is an enlarged partial frontal view of an incidence face of a light guide plate employed in the seventh embodiment.

Light guide plate 4 illustrated therein has inclination surface 34 which is formed on emission face 7 in the vicinity of incidence face 5 and on the outside of effective light emitting area 18 as to extend over side faces 15 and 16.

Inclination surface 34 is formed as to cause light guide plate 4 to have a decreasing thickness toward incidence face 5, being inclined at inclination angle δ4 on the side of side face 15 (See FIG. 12c) and at inclination angle δ3 on the side of side face 16 (See FIG. 12e). Inclination angle of inclination surface 34 at incidence face 5 is generally the same as that of light guide plate 4 in accordance with the first embodiment (See FIG. 3e).

It is noted that inclination surface 34 employed in this embodiment is formed as to cause light guide plate 4 to have a decreasing thickness toward incidence face 5, contrary to inclination surface 27 of light guide plate 4 employed in the second embodiment, and width from a position of connection portion 35 between inclination surface 34 and the rest of emission face 7 (having no inclination surface) to incidence face 5 is larger on the side of side face 16 than on the side of side face 15, contrary to the case of the second embodiment.

This light guide plate 4 can obtain generally the same effects as those of the second embodiment. In addition, surface light source device 1 and display 2 employing light guide plate 4 can obtain generally the same effects as those of surface light source device 1 and display 2 employing light guide plate 4 in accordance with the second embodiment.

It is noted that this embodiment allows inclination surface 34 may be, instead of flat surface as shown in FIG. 12c or 12e, a smoothly curved surface (such as curved surface of curvature radius R6) as shown in FIG. 12f. It is further noted that inclination surface 34 has the maximum inclination direction along A5-A5 in FIG. 12a, which is inclined to the side of side face 15 with respect to primary optical axis (strait line) 17.

Eighth Embodiment

FIGS. 13a to 13c illustrate light guide plate 4 of the eighth embodiment to which the present invention is applied. FIG. 13a is a plan view light guide plate 4 and FIGS. 13b, 13c are side views of light guide plate 4, as viewed from the sides of side face 15 and side face 16 thereof, respectively.

Light guide plate 4 illustrated therein corresponding to a modification of light guide plate 4 of the sixth embodiment. A feature thereof is that inclined side face 16a connected to incidence face 5 is formed by cutting off side face 16 in the outside of effective light emitting area 18 with an increasing depth away from incidence face 5.

Light L3, which would be emitted from side face 21 at the outside of effective light emitting area 18 if this cutting off does not formed, is inner-reflected by inclined side face 16a obliquely (to the side of effective light emitting area 18) through optical effects generally the same as those of the third embodiment, becoming light L4. Light L4 avoids the vicinity of corner portion C2' of effective light emitting area 18 corresponding to corner portion C2 from having a dark portion.

Therefore light guide plate 4 realizes a more positive emission brightness uniformalization effect obtained by synergism of inclined side face 16a and inclination surface 33, in generally the same way as the third embodiment.

Ninth Embodiment

FIGS. 14a to 14d illustrate light guide plate 4 of the ninth embodiment to which the present invention is applied. The ninth embodiment corresponds to a modification of the sixth embodiment. FIG. 14a is a plan view light guide plate 4 and FIG. 14b is side view of light guide plate 4, as viewed from the side of side face 15 thereof, and FIG. 14c is a partially enlarged illustration of light guide plate 4 shown in FIG. 14b, and FIG. 14d is side view of light guide plate 4, as viewed from the side of side face 16 thereof.

Light guide plate 4 illustrated therein has planar portion (planar portion parallel with effective light emitting area 18) 36 of a constant width w3 is formed along side face 16 at an end portion of inclination surface 33 on the side of side face 16. This enables planar portion 36 formed in the outside of effective light emitting area 18 to be utilized for positioning.

As a result, assembling of light guide plate 4 and members other than light guide plate 4 is made easy and handling of light guide plate 4 is made easy, too. Since light guide plate 4 of this embodiment is tha same as the sixth embodiment except for planar portion 36, generally the same effects as those of the first embodiment are obtained.

Surface light source device 1 and display 2 employing light guide plate 4 obtain generally the same effects as those of surface light source device 1 and display 2 employing light guide plate 4 in accordance with the sixth embodiment.

Tenth Embodiment

FIGS. 15a to 15e illustrate light guide plate 4 of the tenth embodiment to which the present invention is applied. The tenth embodiment corresponds to a modification of the seventh embodiment.

FIG. 15a is a plan view light guide plate 4 and FIG. 15b is side view of light guide plate 4, as viewed from the side of side face 15 thereof, and FIG. 15c is a partially enlarged illustration of light guide plate 4 shown in FIG. 15b, and FIG. 15d is side view of light guide plate 4, as viewed from the side of side face 16 thereof, and further, FIG. 15e is a partially enlarged illustration of light guide plate 4 shown in FIG. 15d.

Light guide plate 4 illustrated therein has planar portion (planar portion parallel with effective light emitting area 18) 37 of a constant width w4 is formed along incidence face 5 at an end portion of inclination surface 34 on the side of incidence face 5.

This enables planar portion 37 formed in the outside of effective light emitting area 18 to be utilized for positioning. As a result, assembling of light guide plate 4 and members other than light guide plate 4 is made easy and handling of light guide plate 4 is made easy, too.

It is noted that an inclination surface may be on back face 8 instead of emission face 7, or on both emission face 7 and back face 8.

Although the instant specification gives description of the embodiments in which an inclination surface is formed in the vicinity of incidence face 5 as to cause an inner propagation optical axis of LED 6 to be inclined to the side of an area that includes many long light paths in light guide plate 4, this does not limit the scope of the present invention.

The gist of the present invention is that an inclination surface is formed, depending on unbalance in brightness expected under a condition such that no inclination surface is formed, as to reduce the unbalance.

It is suitable that the inclination surface is formed as to bring a larger thickness in the vicinity of a side face corresponding to one of the right-hand and left-hand regions that requires more light quantity and thickness decreases away from there, as viewed from a frontal direction of incidence face 5 or cross sections parallel to incidence face 5.

In addition, light guide plate 4 in accordance with this embodiment Since light guide plate 4 of this embodiment is the same as the seventh embodiment except for planar portion 37, generally the same effects as those of the seventh embodiment are obtained.

Further, surface light source device 1 and display 2 employing light guide plate 4 obtain generally the same effects as those of surface light source device 1 and display 2 employing light guide plate 4 in accordance with the seventh embodiment.

What is claimed is:

1. A light guide plate comprising:
   an emission face provided by a first major face;
   a back face provided by a second major face opposite to said emission face;
   a side peripheral face giving a bridge between said emission face and said back face;
   at least one incidence face provided by a part of said side peripheral face, being supplied with primary light from a primary light source disposed opposite to said incidence face, said emission face comprising:
      an inclined surface which is not parallel with the rest of said emission face and extends at least in the vicinity of said incidence face, and
      an effective light emitting area which includes first and second regions disposed at either sides of an optical axis of said primary light, and
   said inclined surface is sloped downwards in a direction crossing said optical axis so that said light guide plate decreases in thickness as said inclined surface is sloped downwards away in parallel with said incidence face from a part of said side peripheral face corresponding to a larger one of said first and second regions,
   wherein each of said emission face and said back face is shaped like a rectangle having a pair of long sides and a pair of short sides, said incidence face is formed across a thickness of said light guide plate at least one corner portion as to extend obliquely with respect to each of said one of said long sides and said one of said short sides.

2. A surface light source device comprising:
   a light guide plate in accordance with claim 1; and
   a primary light source disposed opposite to said incidence face.

3. A display comprising:
   a surface light source device in accordance with claim 2; and
   an object-to-be-illuminated for displaying illuminated by said surface light source device.

* * * * *